(12) United States Patent
Mikawa et al.

(10) Patent No.: US 9,258,471 B2
(45) Date of Patent: Feb. 9, 2016

(54) IMAGE PICKUP APPARATUS, INFORMATION DISTRIBUTING APPARATUS, INFORMATION TRANSMISSION METHOD, INFORMATION DISTRIBUTION METHOD, AND COMPUTER-READABLE STORAGE MEDIUM STORING CONTROL PROGRAM THEREFOR

(75) Inventors: Chiaki Mikawa, Yokohama (JP); Kanako Yamakawa, Kawasaki (JP); Takuma Mikawa, Kawasaki (JP); Yoko Hirotani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1187 days.

(21) Appl. No.: 13/156,756

(22) Filed: Jun. 9, 2011

(65) Prior Publication Data

US 2011/0310259 A1 Dec. 22, 2011

(30) Foreign Application Priority Data

Jun. 21, 2010 (JP) .................. 2010-140528

(51) Int. Cl.
*H04N 5/232* (2006.01)
*H04N 21/4223* (2011.01)
(Continued)

(52) U.S. Cl.
CPC ........... *H04N 5/232* (2013.01); *H04N 5/23206* (2013.01);
(Continued)

(58) Field of Classification Search
CPC .............. H04N 5/232; H04N 21/4223; H04N 21/2396; H04N 21/25841; H04N 21/2743; H04N 5/23206; H04N 21/8153; H04N 21/41407

USPC ............... 348/207.99, 207.1, 207.11, 211.99, 348/211.1, 211.2, 211.3, 211.4, 211.5, 348/211.6, 211.7, 211.8, 211.9, 211.11, 348/211.12, 211.13, 211.14; 709/201, 202, 709/203, 208, 209, 210, 211, 213, 214, 215, 709/216, 217, 218, 219, 227, 228, 230, 231, 709/232

See application file for complete search history.

(56) References Cited

U.S. PATENT DOCUMENTS

| 7,986,344 B1* | 7/2011 | Ishii | ................... H04N 1/00204 348/211.3 |
| 2005/0134694 A1* | 6/2005 | Kasai | ................. H04N 1/00209 348/211.1 |

(Continued)

FOREIGN PATENT DOCUMENTS

JP 2005-339214 12/2005

*Primary Examiner* — Twyler Haskins
*Assistant Examiner* — Peter Chon
(74) *Attorney, Agent, or Firm* — Cowan, Liebowitz & Latman, P.C.

(57) ABSTRACT

An image pickup apparatus capable of preventing a user who uses another device from knowing the current location of a photographer based on shooting information about an image when an external apparatus distributes the image to the other device. A calculation unit calculates a distance from the shooting location of the image file to the current location of the image pickup apparatus. A distance determination unit determines whether the calculated distance is larger than a predetermined lower limit. A transmission control unit controls to transmit the image file to the external apparatus when the distance determination unit determines that the distance is larger than the lower limit, and not to transmit the image file to the external apparatus when the distance determination unit determines that the distance is not larger than the lower limit.

9 Claims, 19 Drawing Sheets

(51) Int. Cl.
*H04N 21/239* (2011.01)
*H04N 21/258* (2011.01)
*H04N 21/2743* (2011.01)
*H04N 21/81* (2011.01)
*H04N 21/414* (2011.01)

(52) U.S. Cl.
CPC ..... *H04N 21/2396* (2013.01); *H04N 21/25841* (2013.01); *H04N 21/2743* (2013.01); *H04N 21/41407* (2013.01); *H04N 21/4223* (2013.01); *H04N 21/8153* (2013.01)

(56) References Cited

U.S. PATENT DOCUMENTS

| | | | |
|---|---|---|---|
| 2010/0217794 A1* | 8/2010 | Strandell | H04L 67/2804 709/203 |
| 2011/0069179 A1* | 3/2011 | Bathiche | H04N 5/23206 348/207.1 |
| 2011/0292231 A1* | 12/2011 | Winters | G06F 17/30265 348/222.1 |
| 2012/0081556 A1* | 4/2012 | Hwang | H04N 1/00411 348/207.1 |

* cited by examiner

FIG.6

| NUMBER OF UPLOAD DESTINATION | URL OF UPLOAD DESTINATION | LOWER LIMIT | MEMO |
|---|---|---|---|
| 1 | http://www.familyX | 0m | Family Album |
| 2 | http://www.blog.XX | 3000m | Blog |
| 3 | http://www.company | 1000m | Company HP |

FIG.8

| NUMBER OF TIME ZONE | TIME ZONE | LOWER LIMIT |
|---|---|---|
| 1 | 00:00:00~02:59:59 | 3000m |
| 2 | 03:00:00~05:59:59 | 3000m |
| 3 | 06:00:00~08:59:59 | 3000m |
| 4 | 09:00:00~11:59:59 | 0m |
| 5 | 12:00:00~14:59:59 | 0m |
| 6 | 15:00:00~17:59:59 | 0m |
| 7 | 18:00:00~20:59:59 | 3000m |
| 8 | 21:00:00~23:59:59 | 3000m |

IMAGE PICKUP APPARATUS, INFORMATION DISTRIBUTING APPARATUS, INFORMATION TRANSMISSION METHOD, INFORMATION DISTRIBUTION METHOD, AND COMPUTER-READABLE STORAGE MEDIUM STORING CONTROL PROGRAM THEREFOR

BACKGROUND OF THE INVENTION

1. Field of the Invention

The present invention relates to an image pickup apparatus, an information distributing apparatus, an information transmission method, an information distribution method, and computer-readable storage mediums storing control programs therefor. Particularly, the present invention relates to a technique that an information distributing apparatus like a server receives an image file that has been taken and processed by an image pickup apparatus like a camera and distributes the image file to another apparatus via a network.

2. Description of the Related Art

Generally, a digital camera, a camera cell phone (it is simply called a cell phone hereafter), etc. are known as image pickup apparatus, for example. Then, there is a known technique that a digital camera or a cell phone transmits a shot image to a server and the server distributes the received image to other devices by uploading the image to a Web page.

The server can distribute shooting information that shows a shooting location (GPS information etc.) added to the image concerned and shooting date/time together with the image to another device by uploading the shooting information to the Web page (see Japanese Laid-Open Patent Publication (Kokai) No. 2005-339214 (JP 2005-339214A)).

As mentioned above, when the server distributes the WEB page that discloses the shooting time and the shooting location with the image to the other apparatus, the user who uses the other apparatus may know the current location of a photographer. Such disclosure of the current location of the photographer to many and unspecified persons may be improper.

SUMMARY OF THE INVENTION

The present invention provides an image pickup apparatus, an information distributing apparatus, an information transmission method, an information distribution method, and programs therefor, which are capable of preventing a user who uses another device from knowing the current location of a photographer based on shooting information about an image when the image is distributed to the other device.

Accordingly, a first aspect of the present invention provides an image pickup apparatus capable of transmitting an image file acquired by shooting to an external apparatus, comprising a calculation unit configured to calculate a distance from a shooting location of the image file to a current location of the image pickup apparatus, a distance determination unit configured to determine whether the distance calculated by the calculation unit is larger than a predetermined lower limit, and a transmission control unit configured to control to transmit the image file to the external apparatus when the distance determination unit determines that the distance is larger than the lower limit, and not to transmit the image file to the external apparatus when the distance determination unit determines that the distance is not larger than the lower limit.

Accordingly, a second aspect of the present invention provides An image pickup apparatus capable of transmitting an image file acquired by shooting to an external apparatus, comprising a time determination unit configured to determine whether lapsed time from the shooting date/time of the image file to the current time is longer than a predetermined standby time, and a transmission control unit configured to control to transmit the image file to the external apparatus when the time determination unit determines that the lapsed time is longer than the standby time, and not to transmit the image file to the external apparatus when the time determination unit determines that the lapsed time is not longer than the standby time.

Accordingly, a third aspect of the present invention provides an image pickup apparatus capable of transmitting an image file acquired by shooting to an external apparatus, comprising a calculation unit configured to calculate a distance from a shooting location of the image file to a current location of the image pickup apparatus, a distance determination unit configured to determine whether the distance calculated by the calculation unit is larger than a predetermined lower limit, and a transmission control unit configured to control to transmit image data and shooting location information contained in the image file to the external apparatus when the distance determination unit determines that the distance is larger than the lower limit, and to transmit the image data contained in the image file to the external apparatus and not to transmit the shooting location information when the distance determination unit determines that the distance is not larger than the lower limit.

Accordingly, a fourth aspect of the present invention provides an information distributing apparatus capable of receiving an image file from an external apparatus and distributing the image file to another device, comprising an acquisition unit configured to acquire a current location of the external apparatus, a calculation unit configured to calculate a distance from a shooting location of the image file to the current location of the external apparatus acquired by the acquisition unit, a distance determination unit configured to determine whether the distance calculated by the calculation unit is larger than a predetermined lower limit, and a distribution control unit configured to control to distribute the image file to the other device when the distance determination unit determines that the distance is larger than the lower limit, and not to distribute the image file to the other device when the distance determination unit determines that the distance is not larger than the lower limit.

Accordingly, a fifth aspect of the present invention provides an information distributing apparatus capable of receiving an image file from an external apparatus and distributing the image file to another device, comprising a time determination unit configured to determine whether lapsed time from the shooting date/time of the image file to the current time is longer than a predetermined standby time, and a distribution control unit configured to control to distribute the image file to the other device when the time determination unit determines that the lapsed time is longer than the standby time, and not to transmit the image file to the other device when the time determination unit determines that the lapsed time is not longer than the standby time.

Accordingly, a sixth aspect of the present invention provides an information distributing apparatus capable of receiving an image file from an external apparatus and distributing the image file to another device, comprising a time determination unit configured to determine whether lapsed time from the shooting date/time of the image file to the current time is longer than a predetermined standby time, and a distribution control unit configured to control to distribute image data and shooting location information contained in the image file to the other device when the time determination unit determines that the lapsed time is longer than the standby time, and to distribute the image data contained in the image file to the other device and not to distribute the shooting location information when the time determination unit determines that the lapsed time is not longer than the standby time.

Furthermore, the present invention provides control methods for the apparatuses according to the above-mentioned first through sixth aspects, and storage mediums storing control programs that cause a computer to execute the control methods.

According to the present invention, since distribution of the shooting location information showing the shooting location of the image is controlled according to the moving distance of the photographer from the shooting location or the lapsed time from the shooting date/time, there is an effect of preventing another user from knowing the current location of the photographer.

Further features of the present invention will become apparent from the following description of exemplary embodiments (with reference to the attached drawings).

BRIEF DESCRIPTION OF THE DRAWINGS

FIG. 6 is a view showing examples of the lower limits for respective upload destinations set through the lower limit setting screen shown in FIG. 5.

FIG. 8 is a view showing examples of the lower limits for respective time zones set in the digital camera shown in FIG. 1.

DESCRIPTION OF THE EMBODIMENTS

Hereafter, examples of an image pickup apparatus and an information distributing apparatus according to an embodiment of the present invention will be described with reference to the attached drawings.

Figure 1:
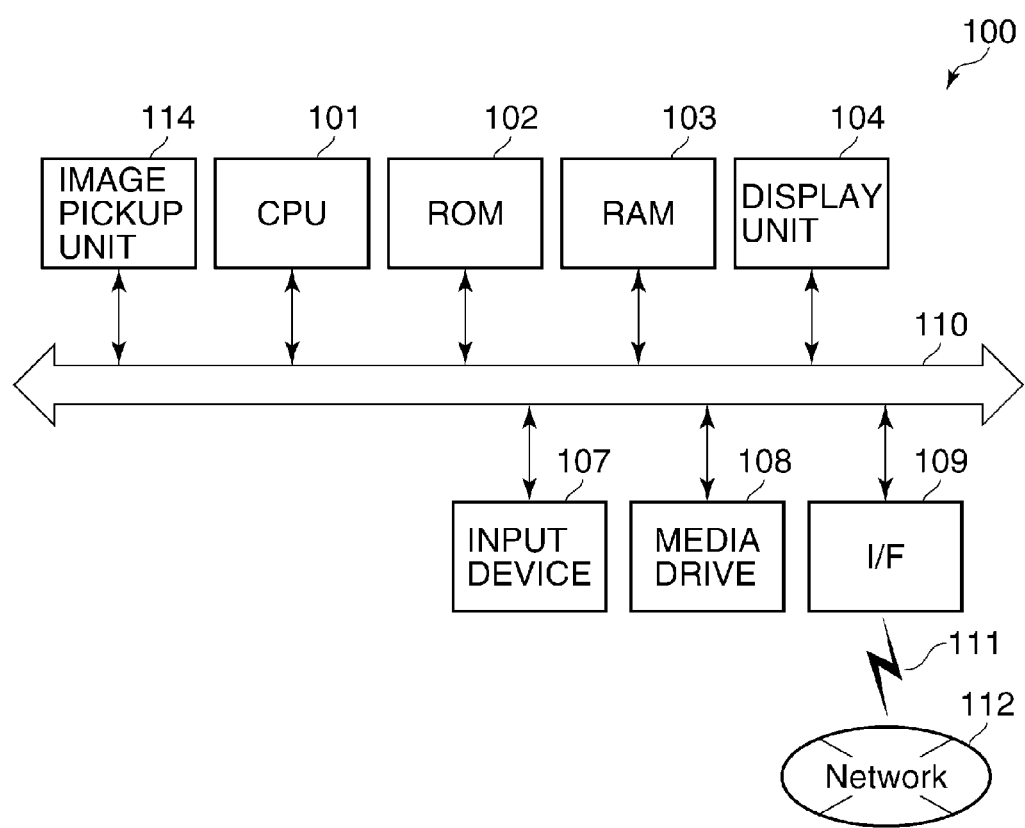
FIG. 1 is a block diagram schematically showing a configuration of a digital camera as an image pickup apparatus according to an embodiment of the present invention.

FIG. 1 is a block diagram schematically showing a configuration of a digital camera as the image pickup apparatus according to the embodiment of the present invention.

The illustrated digital camera takes at least one of a still image and a moving image, and records the taken image into a storage medium. It should be noted that functions for processing the image data stored in the storage medium will be described in the following description. Since the shooting function of the digital camera is well known, a description therefor is omitted.

As shown in FIG. 1, the digital camera 100 has an image pickup unit 114, and the image pickup unit 114 applies photoelectric conversion to an optical image to generate image data by a solid state image pickup device (not shown), for example. A CPU 101 manages the entire control of the digital camera 100.

A ROM 102 stores operation process procedures (programs for a startup process at the time of the digital camera 100 turns on, a basic input/output process, etc.)) of the CPU 101. A RAM 103 functions as a main memory of the CPU 101. Various programs including control programs for achieving the below-mentioned processes are loaded to the RAM 103 from the ROM 102 etc., and the CPU 101 executes the programs loaded to the RAM 103. The RAM 103 is used as a work area at the time of execution of various processes by the CPU 101.

A display unit 104 is an LCD (a liquid crystal display), for example, and the display unit 104 displays various kinds of information, such as an image and a text, which are stored in the storage medium (not shown) under the control of the CPU 101. The input device 107 is used by a user to operate the digital camera 100, and is provided with various buttons etc., for example.

A media drive 108 can be equipped with the above-mentioned storage medium. When data like image data is stored into the storage medium, the media drive 108 is equipped with the storage medium. Also when the data stored in the storage medium is read, the media drive 108 is equipped with the storage medium.

The illustrated digital camera 100 has a network interface (I/F) 109, and the I/F 109 is connected with a computer network 112 via a communication line 111. Then, the digital camera 100 exchanges various kinds of data like image data with a WEB server or a personal computer (not shown in FIG. 1) by the I/F 109.

The CPU 101 connects to the network 112 via the communication line 111. Then, the CPU 101 acquires the location of the digital camera 100 from an external server (not shown).

The external server calculates the location of the digital camera 100 using a global positioning system (referred to as GPS, hereafter).

It should be noted that the digital camera 100 may be provided with a GPS antenna to receive GPS signals from GPS satellites so that the CPU 101 calculates the location of the digital camera 100 according to the GPS signals.

As shown in FIG. 1, the CPU 101, the ROM 102, the RAM 103, the display unit 104, the input device 107, the media drive 108, the I/F 109, and the image pickup unit 114 are mutually connected via a system bus 110, which consists of an address bus, a data bus, and a control bus.

Figure 2:
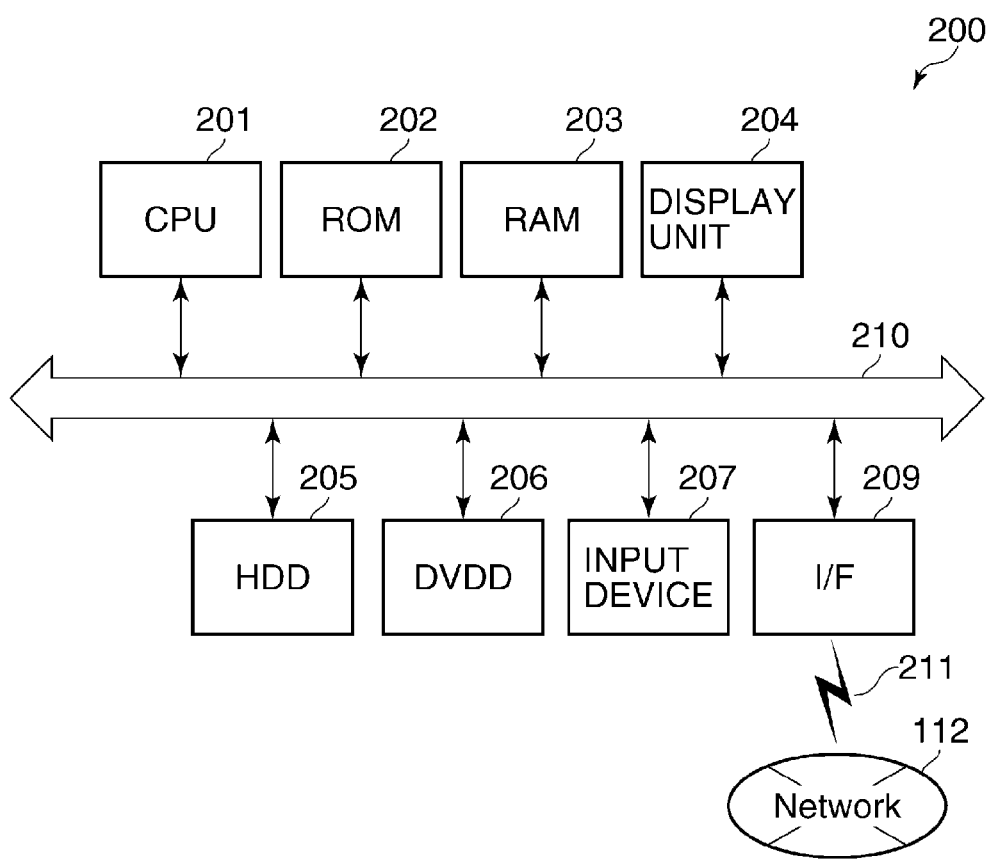
FIG. 2 is a block diagram schematically showing a configuration of a WEB server as an information distributing apparatus according to the embodiment of the present invention.

FIG. 2 is a block diagram schematically showing a configuration of a WEB server as an information distributing apparatus according to the embodiment of the present invention.

The illustrated WEB server receives various kinds of data (image data etc.) via the network 112 from the digital camera 100, and distributes a WEB page including the image data concerned etc. to another apparatus connected to the network 112.

As shown in FIG. 2, the WEB server 200 receives the image data from an external apparatus like the digital camera 100 (FIG. 1) via the network, stores the received data, and distributes the data to other devices via the network by disclosing the image concerned onto a WEB page.

The WEB server 200 has a CPU 201, and the CPU 201 manages the entire control of the WEB server 200. A ROM 202 stores operation process procedures (programs for a startup process at the of the computer turns on, a basic input/output process, etc.)) of the CPU 201.

A RAM 203 functions as a main memory of the CPU 201. Various programs including a control program for achieving the below-mentioned process are loaded to the RAM 203 from a hard disk drive 205. Then, the CPU 201 executes the program loaded to the RAM 203. The RAM 203 is used as a work area at the time of execution of various processes by the CPU 201.

A display unit 204 displays various kinds of information under control of the CPU 201. The WEB server 200 is provided with the hard disk drive (HDD) 205 and a DVD drive (DVDD) 206. The HDD 205 and the DVDD 206 are used for saving and reading an application program, data, a library, etc.

It should be noted that an optical disk drive like a CD-ROM drive, a magneto-optic disk drive like an MO disk drive, a tape streamer, a magnetic tape drive like a DDS in addition to or instead of the DVDD 206.

An input device 207 includes a keyboard, a pointing device, etc., for example. A network interface (I/F) 209 is connected with the computer network 112 via a communication line 211. The WEB server 200 exchanges various kinds of data with devices connected to the network 112 by the I/F 209.

When acquiring location information that shows a location of an apparatus connected to the network 112, the CPU 201 connects to the computer network 212 via the communication line 211, and communicates with the external server that calculates the location of the apparatus using the GPS to acquire the location information about the apparatus concerned. Or, the CPU 201 directly acquires the location information that shows the location from the apparatus concerned via the communication line 211.

It should be noted that the CPU 201, the ROM 202, the RAM 203, the display unit 204, the HDD 205, the DVDD 206, the input device 207, and the I/F 209 are mutually connected via a system bus 210, which consists of an address bus, a data bus, and a control bus.

Figure 3:
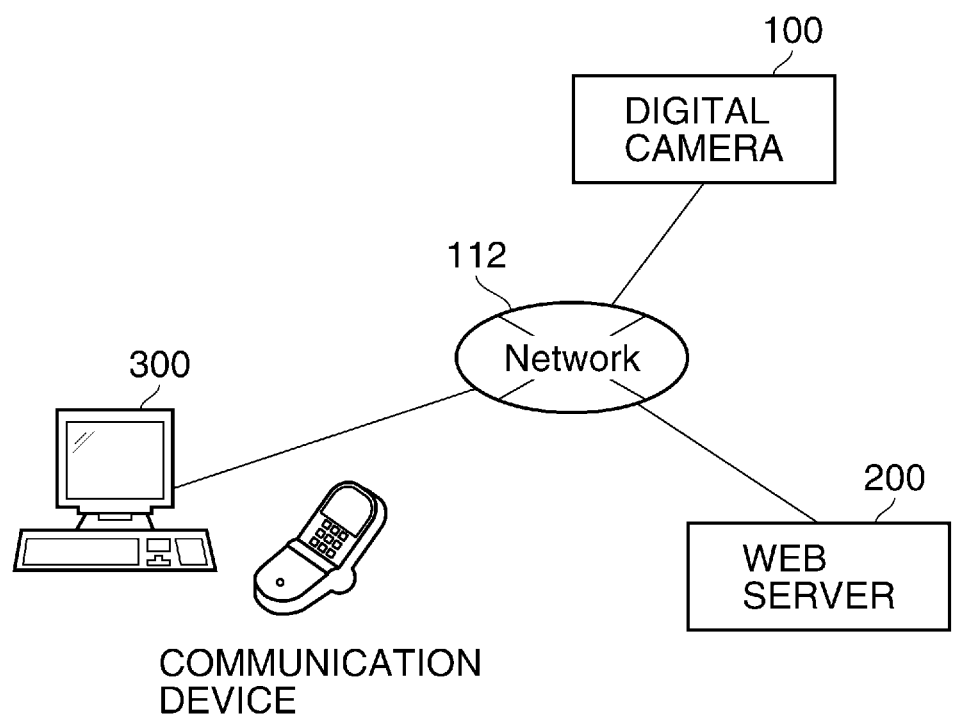
FIG. 3 is a view showing an example of an image processing system that includes the digital camera (the image pickup apparatus) shown in FIG. 1 and the WEB server shown in FIG. 2.

FIG. 3 is a view showing an example of an image processing system that includes the digital camera (the image pickup apparatus) 100 shown in FIG. 1 and the WEB server 200 shown in FIG. 2.

As shown in FIG. 3, in the illustrated image processing system, the digital camera 100 and the WEB server 200 are mutually connected via the network 112. In the illustrated example, communication devices (other devices) 300 are connected to the network 112. Here, the other devices 300 are a personal computer and a cell phone, for example.

In the illustrated image processing system, the image data obtained as a result of shooting by the digital camera 100 is uploaded to the WEB server 200 via the network 112. Then, the WEB server 200 stores the received image data as an image file to the HDD 205 (FIG. 2). The WEB server 200 is an information distributing apparatus that distributes the image data to the communication devices 300 in response to requests from the communication devices 300.

When the image data expresses a still image, the image file includes an attribution information area, a reduction image area, and an original image area. The attribution information area stores attribution information, which includes shooting information and flag information. The shooting information includes an image data size, date/time of shooting, a shooting location, a camera model, ON/OFF of flash, etc. The flag information includes an uploaded flag, a distributed flag, etc.

It should be noted that the uploaded flag expresses whether the file has been uploaded to the WEB server 200. The distributed flag expresses whether the WEB server 200 has distributed the image data concerned to the other devices 300 by disclosing the data on a WEB page.

Reduced image data displayed on a list screen is recorded in the reduction image area. Original still image data is recorded in the original image area. After generating the image data, the CPU 101 (FIG. 1) generates the image file by adding the attribution information. Then, the CPU 101 stores the image file to the storage medium via the media drive 108. The series of processes is called "shooting" hereafter.

When generating the image file, the CPU 101 acquires a shooting location. Then, the CPU 101 records location information (latitude, longitude, altitude, and positioning time, etc.) into the attribution information area as a shooting location. When generating the image file, the CPU 101 sets FALSEs to the uploaded flag and the distributed flag and records them in the attribution information area.

Figure 4:
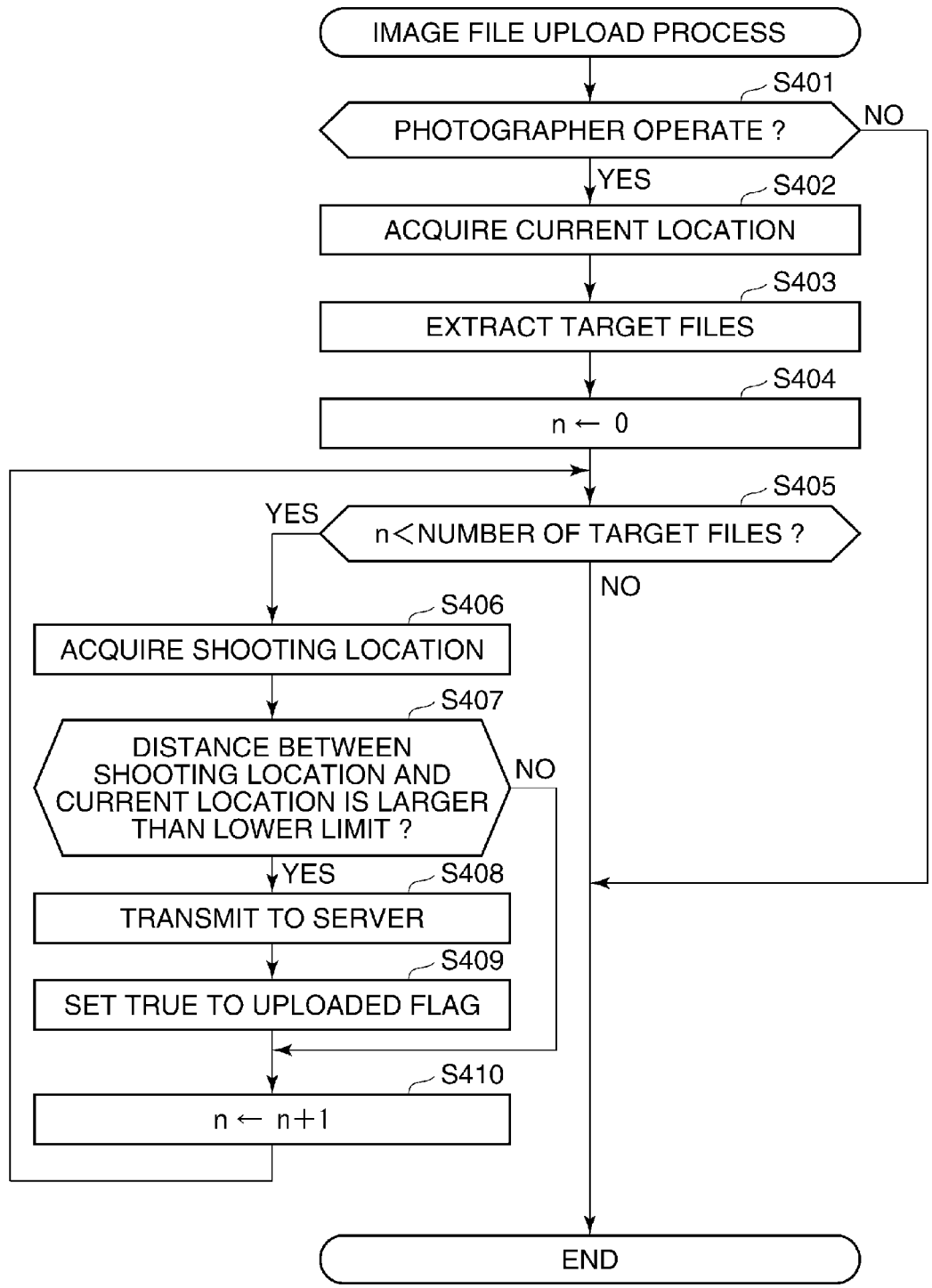
FIG. 4 is a flowchart showing an operation of the digital camera shown in FIG. 1 at the time of uploading an image file to the WEB server shown in FIG. 2.

FIG. 4 is a flowchart showing an operation of the digital camera 100 shown in FIG. 1 at the time of uploading an image file to the WEB server 200 shown in FIG. 2. It should be noted that the process shown in FIG. 4 is performed when the CPU 101 executes the control program stored in the RAM 103.

As shown in FIG. 1 and FIG. 4, the digital camera 100 uploads a still image file as an image file to the WEB server 200 here. When an image file upload process is started, the CPU 101 determines whether a photographer has performed a predetermined operation (step S401). Here, the predetermined operation is a switch ON operation or an insertion of battery, for example. When determining that there is no predetermined operation (NO in the step S401), the CPU 101 finishes the process.

On the other hand, when determining that there has been the predetermined operation (YES in the step S401), the CPU 101 acquires the location information that shows the current location of the digital camera 100 (step S402).

Next, the CPU 101 extracts the target image files that will be uploaded to the WEB server 200 (step S403). First, the CPU 101 refers to the uploaded flag in the attribution information area for every image file stored in the storage medium. Then, the CPU 101 determines that an image file of which the uploaded flag is FALSE is an uploading target, and extracts the image file concerned.

Next, the CPU 101 resets an internal counter n to "0" (step S404). The counter n is used when the CPU 101 executes a series of processes in below-mentioned steps S406 through S409 for each image file as an uploading target.

Next, the CPU 101 determines whether the value of the counter n is smaller than the number of the image files that are uploading targets (step S405). When the value of the counter n is not smaller than the number of the image files of the uploading targets (NO in the step S405), the CPU 101 determines that the series of processes are completed to all the image files, and finishes the process.

When the value of the counter n is smaller than the number of the image files of the uploading targets (YES in the step S405), the CPU 101 transfers the shooting location from the attribution information area of the image file of the uploading target to the RAM 103 (step S406).

Next, the CPU 101 determines whether the distance between the shooting location and the current location shown by the location information is larger than a lower limit beforehand stored in the RAM 103 (step S407). Here, a photographer sets the lower limit arbitrarily and stores it to the RAM 103 of the digital camera 100. It should be noted that a fixed value, 1000 m for example, may be stored to the RAM 103 as the lower limit instead of the setting by a photographer.

When the distance is larger than the lower limit (YES in the step S407), the CPU 101 transmits (uploads) the image file concerned to the WEB server 200 (FIG. 1) via the I/F 109 (step S408). Then, the CPU 101 sets TRUE to the uploaded flag corresponding to the image file concerned (step S409). Then, the CPU 101 increments the counter n by one (n=n+1) in step S410, returns the process to the step S405, and continues the process.

On the other hand, when the distance is not larger than the lower limit (NO in the step S407), the CPU 101 proceeds with the process to the step S410 and increments the counter n without transmitting the image file concerned.

When the image file is uploaded from the digital camera 100 to the WEB server 200 as mentioned above, the WEB server 200 adds the image file concerned to the WEB page. Then, the WEB server 200 distributes the WEB page to the communication devices (the other devices) 300 in response to the requests from the communication devices 300.

Figure 5:
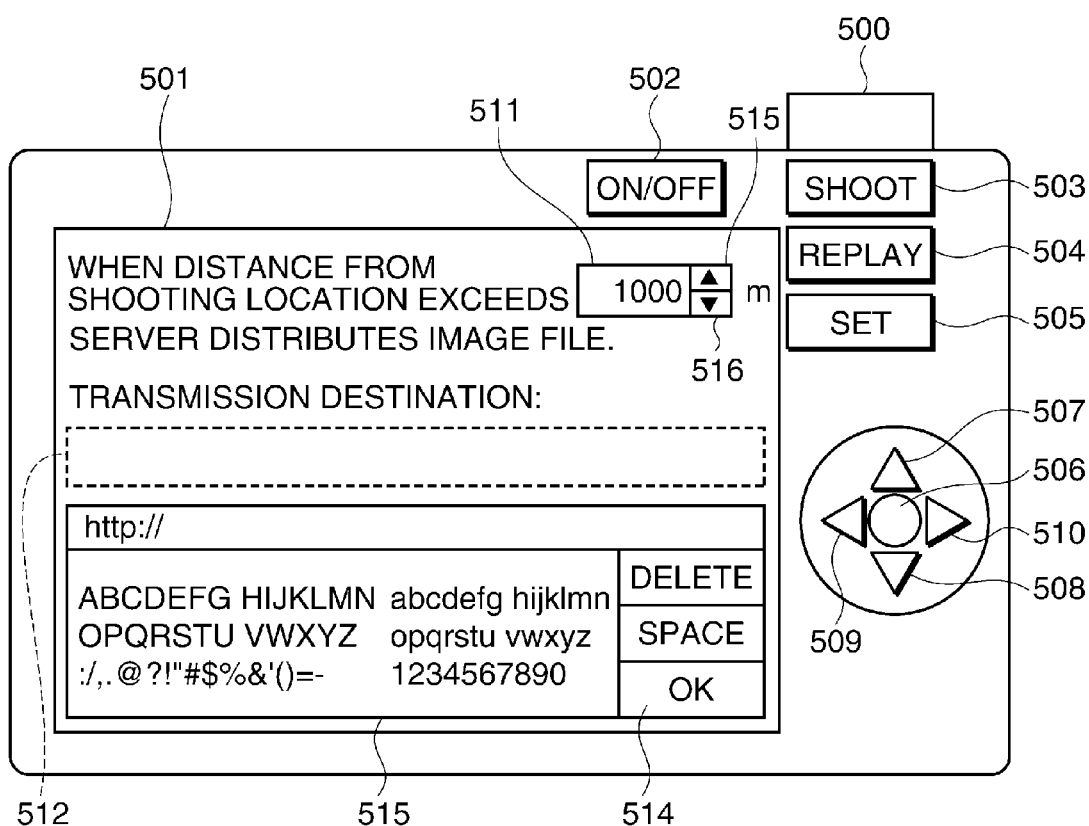
FIG. 5 is a view showing a lower limit setting screen displayed on a display unit shown in FIG. 1 at the time of setting of the lower limit shown in FIG. 4.

FIG. 5 is a view showing a lower limit setting screen displayed on the display unit 104 shown in FIG. 1 at the time of setting of the lower limit shown in FIG. 4.

As shown in FIG. 5, a screen of the display unit 104 and various buttons of the input device 107 are arranged at the back face of the digital camera 100 (FIG. 1). Specifically, the input device 107 has a power button (ON/OFF) 502, a shoot button 503, a replay button 504, a set button 505, and cross key buttons. Then, the cross key buttons are equipped with an OK key 506 and scroll keys (direction keys) 507 through 510. It should be noted that descriptions of operations of the buttons are omitted here. A release button 500 is arranged on a top face of the digital camera 100.

As shown in FIG. 1 and FIG. 5, when a photographer pushes the set button 505, the CPU 101 displays the lower limit setting screen 501 on the display unit 104. The value change buttons 515 and 516 are displayed on the lower limit setting screen 501. The photographer can change the lower limit to a desired value by changing the value (1000 m in the illustrated example) in a lower limit setting box 511 according to an operation of the value change button 515 or 516. Then, when the photographer pushes the OK key 506, the CPU 101 stores the value displayed on the lower limit setting screen 501 into the RAM 103 as the lower limit.

As shown in FIG. 5, an upload destination edit box 512 is displayed in the lower limit setting screen 501, and an upload destination of an image file is inputted into the upload destination edit box 512. Specifically, when a character string selected from a character input area 513 is inputted into the upload destination edit box 512 and an OK button 514 is pushed, the upload destination of the image file is set.

The CPU 101 stores the information (the lower limit and the upload destination) changed or inputted in the lower limit setting screen 501 into the RAM 103. Then, the CPU 101 reads the information if needed, and uses it for various processes.

It should be noted that different lower limits can be set for respective upload destinations in the illustrated example. Information about the upload destination may be set beforehand and may be stored into the RAM 103.

In the above-mentioned example, the CPU 101 refers to the uploaded flag in order to determine whether the image file has been uploaded to the WEB server 200. However, the embodiment is not limited to this, but the CPU 101 may eliminate the image file that has been transmitted to the WEB server 200 from the storage medium. In this case, the CPU 101 determines that the image files stored in the storage medium are not yet uploaded.

Moreover, in the above-mentioned example, the CPU 101 executes the process in the steps S406 through S409 for each image file. However, the embodiment is not limited to this, but the CPU 101 may execute the process in the steps S406 through S409 for each set of related image files that are taken by continuous shooting, bracket shooting, panoramic shooting, etc.

That is, since the related images are taken at the same location in the continuous shooting, the bracket shooting, and panoramic shooting, the same location information is associated with the related image files. Therefore, the process in the steps S406 through S409 can be applied to such a set of related image files at a time.

Specifically, in the step S406, the CPU 101 may just read the shooting location from one of the related image files taken by the continuous shooting, the bracket shooting, or the panoramic shooting, rather than reads the shooting locations from all the related image files.

Next, in the step S407, the CPU 101 determines concerning one shooting location acquired in the step S406. Then, when determining that the distance is larger than the lower limit, the CPU 101 transmits the set of the related image files to the WEB server 200 in the step S408.

In the step S409, the CPU 101 rewrites the uploaded flags of all the related image files that have been transmitted to TRUE. Then, in the step S410, the CPU 101 increments the counter n by the number of the related image files that have been transmitted.

Thus, since the related image files are processed collectively, a load on the CPU 101 is reduced rather than processing the related image files separately.

When the image data expresses a moving image, the image file (i.e., the moving image file) has a moving image information file and a moving image data file. The moving image information file has an attribution information area and a reduction image area. The attribution information area stores attribution information, which includes shooting information and flag information.

The shooting information includes a recording time, a recording start time, a record finish time, a frame rate (frames per second), the shooting time and location for every frame, and sound information, etc. for example. The flag information includes an uploaded flag, a distributed flag, etc.

The reduced image data displayed on the list screen is recorded in the reduction image area. Here, when the moving image data is divided into a plurality of scenes, the reduced image data is generated based on the head frames of the respective scenes. When the moving image data is not divided into scenes, the reduced image data is generated based on the head frame of the moving image data.

The moving image data itself is stored in the moving image data file. The moving image data file is related with the moving image information file, and when the moving image data itself in the moving image data file is replayed, the information in the moving image information file relevant to the moving image data file concerned is used.

Here, assuming that the moving image information file conforms to the DCF standard, the digital camera 100 records information having a tag defined by the DCF standard in conformity with the DCF standard. On the other hand, about information having no tag defined by the DCF standard, the digital camera 100 uses a manufacturer note area.

Here, when generating a moving image file, the CPU 101 acquires a shooting location (a shooting position), and stores the information showing the shooting location, which includes latitude, longitude, an altitude, and a positioning time, into the attribution information area in connection with the frame.

When generating a moving image file, the CPU 101 sets FALSEs to the uploaded flag and the distributed flag that are recorded in the attribution information area.

Next, an operation of the digital camera 100 at the time of uploading a moving image file to the WEB server 200 will be described.

As shown in FIG. 1 and FIG. 4, the digital camera 100 uploads a moving image file as an image file to the WEB server 200 here. It should be noted that the description about the process similar to the upload process for the still image file will be omitted.

When the image file upload process starts, the CPU 101 extracts moving image files that will be uploading targets to the WEB server 200 in step S403. Then, in the step S406, the CPU 101 transfers the shooting location of the final frame from the attribution information area of the moving image file to the RAM 103.

It should be noted that the uploading targets are the moving image files of which the uploaded flags recorded in the attribution information areas are FALSEs among the moving image files stored in the storage medium.

When a still image file and a dynamic image file are stored in the storage medium in a mixed condition, the CPU 101 determines whether the target image file is a still image file or a moving image file before executing the process in the steps S403 and S406. Then, the CPU 101 changes the contents of the process according to the determination result.

When an image file is a moving image file, the CPU 101 reads the shooting location of the final frame in the step S406. However, the acquisition of the shooting location is not limited to this. The determination in the step S407 may use the shooting location that is closest to the current location selected from among the shooting locations of all the frames of the moving image file. This reduces a possibility that the current location of the photographer is specified.

When only the shooting locations of some frames are recorded, the CPU 101 reads only the shooting locations of the frames concerned.

Figure 7:
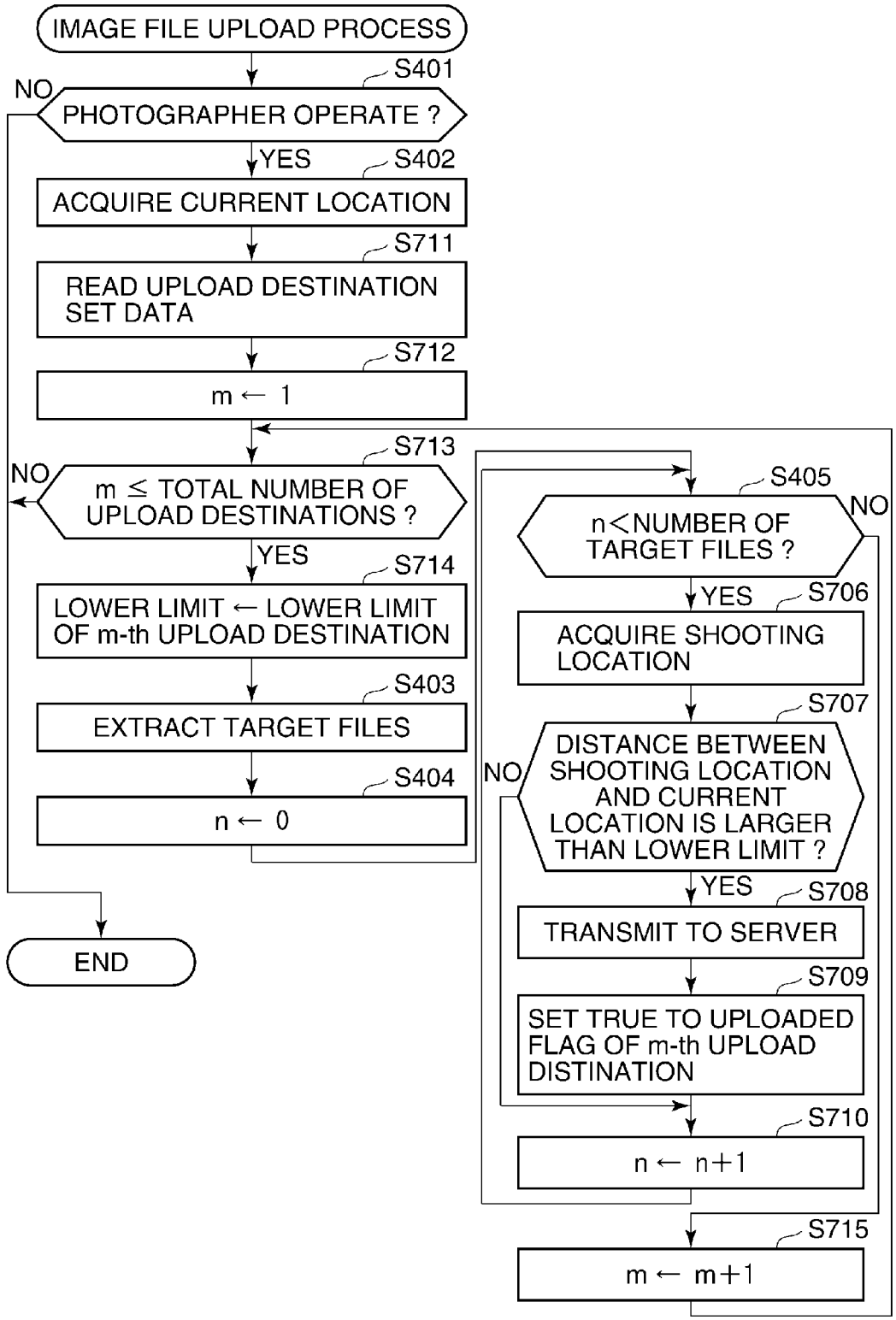
FIG. 7 is a flowchart showing an operation of the digital camera shown in FIG. 1 at the time of uploading an image file to the upload destinations.

FIG. 6 is a view showing examples of the lower limits (upload destination set data) for respective upload destinations set through the lower limit setting screen shown in FIG. 5. FIG. 7 is a flowchart showing an operation of the digital camera 100 shown in FIG. 1 at the time of uploading an image file to the upload destinations. It should be noted that the process shown in FIG. 7 is achieved when the CPU 101 executes the control program stored in the RAM 103.

Here, the same reference numeral is attached to the process similar to the step shown in FIG. 4, and the description thereof is omitted.

When an image file upload process starts, the CPU 101 executes the processes in the steps S401 and S402, and then reads the upload destination set data from the RAM 103, and counts the total number of upload destinations (step S711). Next, the CPU 101 sets "1" to an internal counter m (step S712). The counter m is used when the CPU 101 executes a series of processes in below-mentioned steps S713 through S710 for each of the upload destinations.

Next, the CPU 101 determines whether the value of the counter m is equal to or smaller than the total number of upload destinations (step S713). When the value of the counter m is larger than the total number of upload destinations (NO in the step S713), the CPU 101 determines that the series of processes are completed for all the upload destinations, and finishes the process.

On the other hand, when the value of the counter m is equal to or smaller than the total number of upload destinations (YES in the step S713), the CPU 101 reads the lower limit of the m-th upload destination with reference to the upload destination (transmitting destination) set data shown to FIG. 6. Then, the CPU 101 sets the lower limit read as a lower limit used by the determination in step S707 mentioned later (step S714). Then, the CPU 101 executes the process in the above-mentioned steps S403, S404, and S405.

When the value of the counter n is smaller than the number of the image files of the uploading targets (YES in the step S405), the CPU 101 transfers the shooting location from the attribution information area of the image file of the uploading target to the RAM 103 (step S706).

Next, the CPU 101 determines whether the distance is larger than the lower limit of the m-th upload destination (step S707). When the distance is larger than the lower limit (YES in the step S707), the CPU 101 transmits (uploads) the image file concerned to the WEB server of the m-th upload destination via the I/F 109 (step S708). Then, the CPU 101 sets TRUE to the uploaded flag corresponding to the image file concerned with respect to the m-th upload destination (step S709). Then, the CPU 101 increments the counter n by one (n=n+1) in step S710, returns the process to the step S405, and continues the process.

On the other hand, when the distance is not larger than the lower limit (NO in the step S707), the CPU 101 proceeds with the process to the step S710 and increments the counter n.

When determining that the value of the counter n is equal to or larger than the number of image files of the uploading targets (NO in the step S405), the CPU 101 increments the counter m (m=m+1) in step S715, returns the process to the step S713, and continues the process.

The above-mentioned process allows the photographer to change the lower limit corresponding to the upload destination. For example, when the upload destination is a WEB server for distributing an electronic album that only a family can download, the lower limit is set to 0 m (the transmitting destination of No. 1 shown in FIG. 6). On the other hand, when the upload destination is a WEB server for distributing a blog that many and unspecified readers can download, the lower limit is set to 3000 m (the transmitting destination of No. 2 shown in FIG. 6).

This enables to distribute the shot image immediately to the family that is allowed to know the current location of the photographer. On the other hand, the shot image is distributed to many and unspecified readers to whom the current location of the photographer should not be disclosed, when the photographer is more than 3000 m away from the shooting location. This prevents many and unspecified readers from knowing the current location of the photographer from the shooting time and the shooting location displayed with the image.

It should be noted that the lower limit can be changed according to a time zone. FIG. 8 is a view showing examples of the lower limits for respective time zones set in the digital camera 100 shown in FIG. 1.

When changing the lower limit for every time zone, the CPU 101 executes a process to acquire the current time between the step S403 and the step S404 shown in FIG. 7. Then, the CPU 101 reads the lower limit from the table shown in FIG. 8 according to the current time, and uses the read lower limit in the determination in the step S407.

As shown in FIG. 8, the lower limit in daytime during which many and unspecified users may know the current location of the photographer is set to 0 m, for example. On the other hand, the lower limit at night during which the current location of the photographer should not be disclosed to many and unspecified users is set to 3000 m, for example.

This enables to distribute the shot image immediately in daytime, and to distribute the shot image when the photographer is more than 3000 m away from the shooting location at night. This prevents readers from knowing the current location of the photographer from the shooting time and the shooting location displayed with the image at night.

It should be noted that the lower limit can be changed according to a shooting region (area) instead of the time zone. In this case, the shooting regions instead of the time zones are stored in connection with the lower values in the digital camera 100. In this case, the shooting region is expressed by latitude, longitude, etc. The lower limit in an overseas area can be changed from the lower limit in a domestic area.

The CPU 101 determines whether a photographer is in an overseas area or in a domestic area, by checking whether the photographer operates to change the time zone from the domestic area to the overseas area.

For example, the lower limit in a shooting location where it must take much time to catch up the photographer even if the current location is known by many and unspecified users is set to 0 m. On the other hand, the lower limit in a shooting location where the photographer can be caught up shortly by the user who knows the current location is set to 3000 m.

This enables to distribute the shot image immediately in the former case, and to distribute the shot image when the photographer is more than 3000 m away from the shooting location in the latter case. This prevents readers from knowing the current location of the photographer from the shooting time and the shooting location distributed with the image in the shooting location where the photographer can be caught up shortly.

A lower limit may be changed according to a type or a kind of a shooting region. In this case, the types of shooting locations are stored in the RAM of the digital camera 100, or the CPU 101 sends queries to the WEB server 200 or another external server to acquire the type of the shooting location.

For example, when the type of the shooting location is a shopping quarter, the lower limit is set to 0 m. When the type of the shooting location is a residential quarter, the lower limit is set to 3000 m. This enables to distribute the shot image immediately when the image is shot in the shooting location like a shopping quarter where the users of the communication devices 300 are difficult to find the photographer even if the users know the current location of the photographer. On the other hand, the image shot in the shooting location like a residential quarter where the users of the communication devices 300 who know the current location of the photographer are able to find the photographer easily is distributed when the photographer is more than 3000 m away from the shooting location.

Although the above-mentioned example describes the case where the digital camera 100 uploads the image file to the WEB server 200, it is applicable to a camera cell phone similarly. Furthermore, the above description is similarly applicable to a note-type personal computer or a cell phone that is connected to the digital camera 100 so as to receive and store an image shot by the digital camera 100.

Although the above-mentioned example employs the GPS to acquire a current location, a current location may be calculated based on radio wave state of a wireless base station or a wireless LAN access point rather than the GPS. The above-mentioned methods and the GPS may be used together. In this case, even when a current location cannot be acquired from the GPS (indoor etc.), a location can be acquired from the radio wave state of the wireless base station or the wireless LAN access point. Therefore, a current location can be acquired irrespective of the periphery environment of the digital camera 100.

In this case, the CPU 101 may determine whether a communication path has been changed instead of determining a user's operation in the step S401 in FIG. 4 or FIG. 7, and then, may execute the process in and after the step S402. Here, the communication path is a wireless base station or a wireless LAN access point, for example.

Specifically, the wireless base station to which the cell phone communicates is switched with movement of the cell phone. Then, the CPU 101 starts the process at the switching timing.

Although the process in and after the step S402 is started when detecting the user's operation in the step S401 in the above-mentioned example, it may be started according to the condition of the digital camera 100. For example, the CPU 101 may start the process after lapsing a fixed time without user's operations when the digital camera 100 automatically shifted to a power saving mode. As a result, while the photographer does not use the digital camera 100, the CPU 101 can execute the above-mentioned upload process intensively.

As mentioned above, according to this embodiment, the digital camera 100 calculates a distance between a shooting location of an image file and a current location of the digital camera 100, and controls the transmission of the image file according to the distance. Then, when the calculated distance is beyond the predetermined distance, the image file is automatically uploaded to the WEB server 200. That is, the image file is not transmitted until the image pickup apparatus like a digital camera is away from the shooting location, and the image file is transmitted to the WEB server when the image pickup apparatus is away from the shooting location. This enables to prevent the users of the communication devices who download images from the WEB server 200 from knowing the current location of the photographer based on the shooting information (the shooting location, the shooting time, etc.) added to the image file.

According to a second embodiment, a WEB server calculates a distance between a shooting location of an image and a current location of an image pickup apparatus instead of the image pickup apparatus (a digital camera etc.), and distributes the image file to communication devices when the calculated distance is beyond a predetermined distance. The image pickup apparatus of this embodiment can upload an image to the WEB server immediately after shooting the image. In the following description, descriptions for elements similar to that in the first embodiment are omitted.

Figure 9:
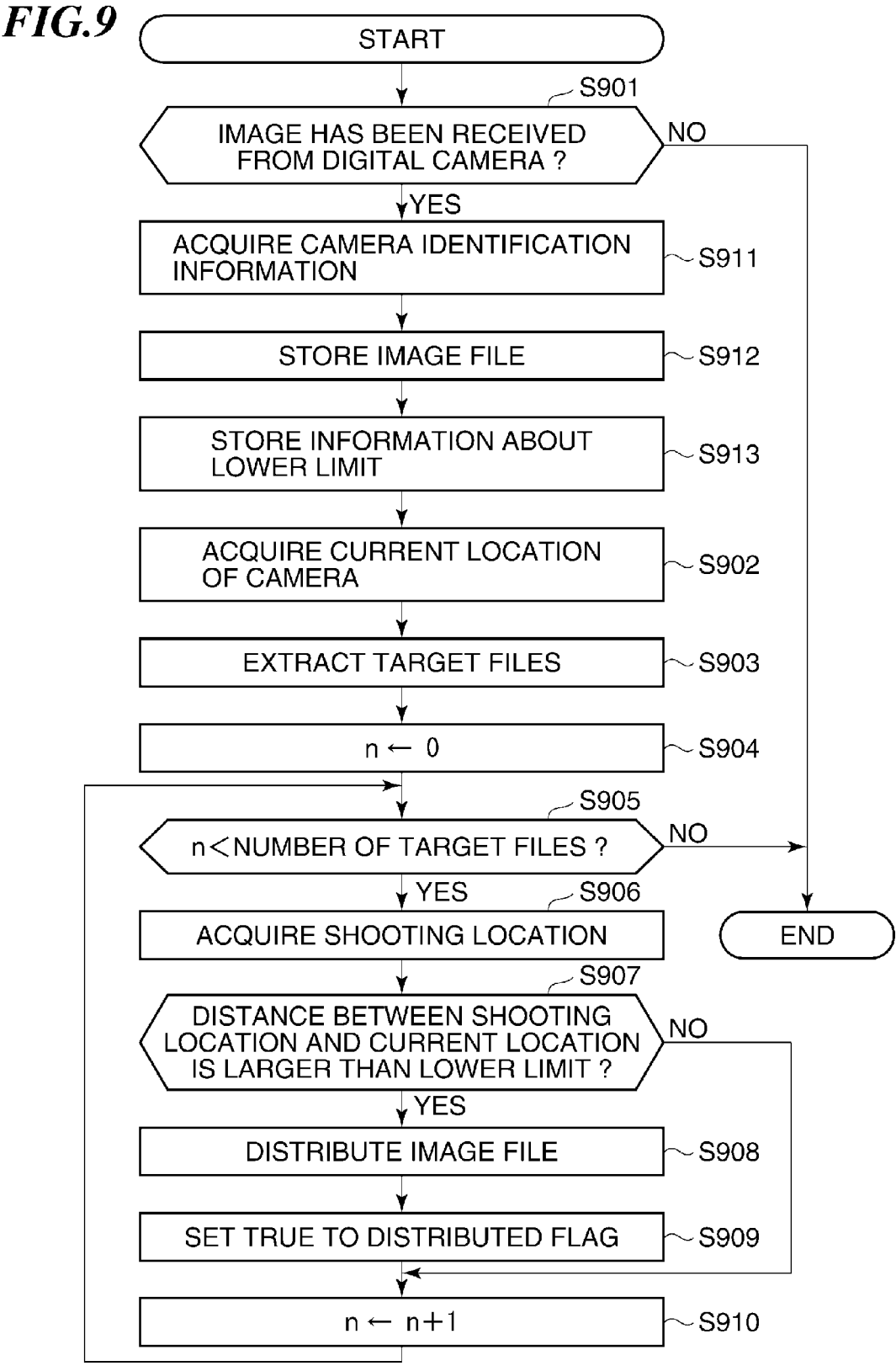
FIG. 9 is a flowchart showing an operation of the WEB server shown in FIG. 3 at the time of receiving an image file from the digital camera and distributing the image file to a communication device.

FIG. 9 is a flowchart showing an operation of the WEB server 200 shown in FIG. 3 at the time of receiving an image file from the digital camera 100 and distributing the image file to a communication device. It should be noted that the process shown in FIG. 9 is achieved when the CPU 201 executes the control program stored in the RAM 203.

As shown in FIG. 2, FIG. 3, and FIG. 9, the CPU 201 determines whether an image file has been received from the digital camera 100 (step S901). When determining that an image file has not been received (NO in the step S901), the CPU 201 finishes the process.

On the other hand, when determining that an image file has been received (YES in the step S901), the CPU 201 acquires camera identification information for identifying the digital camera 100 from the digital camera 100, and stores it to the RAM 203 (step S911).

Next, the CPU 201 stores the received image file into the HDD 205 in connection with the camera identification information (step S912). At the time, the CPU 201 sets the image file concerned so as not to be read from a third party.

Next, the CPU 201 receives information about a lower limit set by the photographer through the above-mentioned lower limit setting box 511 (FIG. 5) on the digital camera 100, and stores it to the RAM 203 (step S913). It should be noted that the photographer may access the WEB server 200 beforehand to input the lower limit. In such a case, the CPU 201 stores the lower limit inputted to the RAM 203.

Next, the CPU 201 acquires the current location information of the digital camera 100 using a GPS system (step S902). It should be noted that when the digital camera 100 holds the current location information, the CPU 201 acquires current location information from the digital camera 100.

Next, the CPU 201 extracts the image files as distribution targets from the HDD 205 (step S903). First, the CPU 201 refers to the distributed flags in the attribution information areas for all the image files related to the target camera identification information among the image files stored in the HDD 205. Then, the CPU 201 extracts an image file of which a distributed flag is FALSE as a distribution target.

Next, the CPU 201 sets "0" to an internal counter n (step S904). The counter n is used when the CPU 201 executes a series of processes in below-mentioned steps S906 through S909 for each image file as an distribution target.

Next, the CPU 201 determines whether the value of the counter n is smaller than the number of the image files that are distribution targets (step S405). When the value of the counter n is smaller than the number of the image files of the distribution targets (YES in the step S905), the CPU 101 transfers the shooting location from the attribution information area of the image file of the distribution target to the RAM 203 (step S906).

Next, the CPU 201 determines whether the distance between the shooting location and the current location is larger than the lower limit stored in the RAM 203 (step S907).

Here, when the lower limit cannot be acquired, the CPU 201 sets 1000 m as the lower limit, for example.

When determining that the distance is larger than the lower limit (YES in the step S907), the CPU 201 adds the image file concerned to a WEB page. Then, the CPU 201 distributes the WEB page in response to requests from the communication devices 300 (step S908).

Next, the CPU 201 rewrites the distributed flag of the image file to TRUE (step S909). Then, the CPU 201 increments the counter n by one (n=n+1) in step S910, returns the process to the step S905, and continues the process.

On the other hand, when determining that the distance is not larger than the lower limit (NO in the step S907), the CPU 101 proceeds with the process to the step S910 and increments the counter n without adding the image file concerned to the WEB page. When determining that the value of the counter n is equal to or larger than the number of the image files of the distribution targets (NO in the step S905), the CPU 201 determines that the series of processes have completed for all the target image files, and finishes the process.

Although the WEB server 200 acquires the current location of the digital camera 100 when receiving the image file from the digital camera 100 in the above-mentioned description, the current location of the digital camera 100 may be acquired in another timing. For example, the WEB server 200 may acquire the current location of the digital camera 100 periodically, or the WEB server 200 may acquire the current location when the communication path of the digital camera 100 changes. As mentioned above, the communication path is a wireless base station or a wireless LAN access point, for example.

As a result, even if the digital camera 100 does not transmit an image file to the WEB server 200 during a certain period, the WEB server 200 can distribute the image file to the communication devices 300 with movement of the photographer.

As mentioned above, according to this embodiment, the WEB server 200 calculates a distance between a shooting location of an image file and a current location of the digital camera 100, and controls the distribution of the image file according to the distance. Then, the WEB server 200 permits the download of the image file to the communication devices 300 automatically when the distance is beyond the predetermined distance. That is, the image file is not distributed until the image pickup apparatus like a digital camera is away from the shooting location, and the image file is distributed to the communication devices 300 when the image pickup apparatus is away from the shooting location. This enables to prevent the users of the communication devices 300 from knowing the current location of the photographer based on the shooting information (the shooting location, the shooting time, etc.) added to the image file.

According to a third embodiment, the image shot by the digital camera 100 is uploaded without shooting location information that shows a shooting location to the WEB server 200. After that, when the digital camera 100 is a predetermined distance away from the shooting location, the digital camera 100 transmits the shooting location of the image to the WEB server 200. It should be noted that the WEB server 200 can distribute the image concerned to the communication devices 300, when receiving an image and a shooting location from the digital camera 100.

Figure 10:
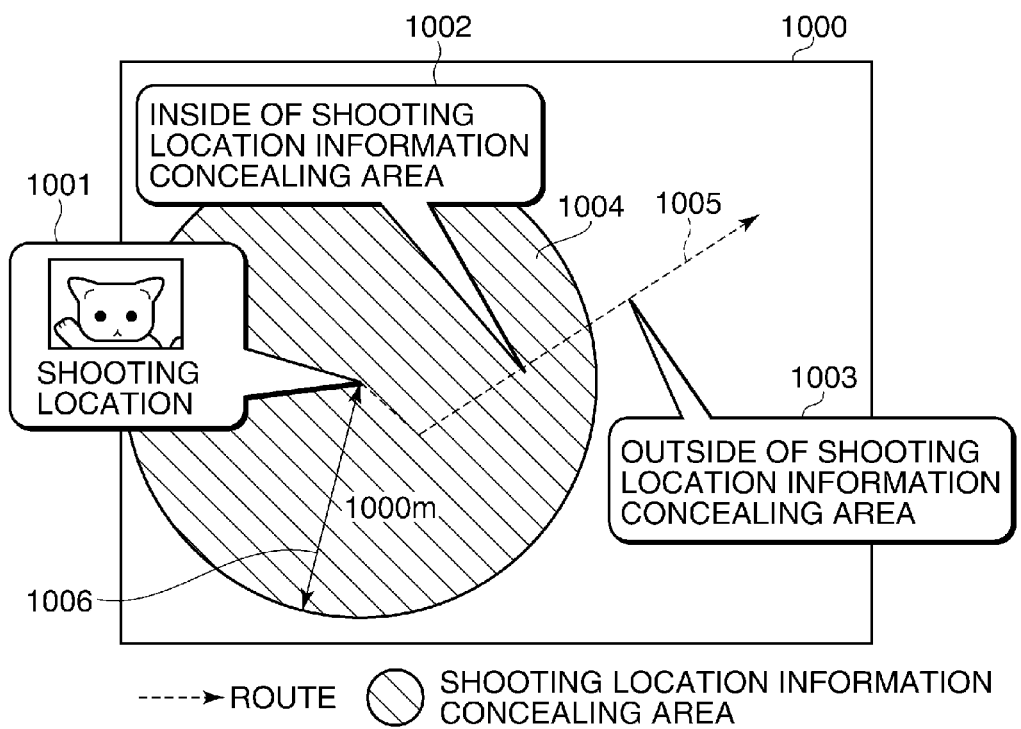
FIG. 10 is a view showing an example of a map on which a shooting location by the digital camera shown in FIG. 1 and a shooting location information concealing area are plotted.

FIG. 10 is a view showing an example of a map on which a shooting location by the digital camera 100 shown in FIG. 1 and a shooting location information concealing area are plotted. The GPS information expresses a current location of the digital camera 100.

It is assumed that the photographer moves along a moving route 1005 shown in FIG. 10 by an arrow of dotted line. An area 1004 is a GPS information concealing area within which the CPU 101 shown in FIG. 1 determines not to transmit the shooting location information to the WEB server 200. The area 1004 is a circle of which a center agrees with the shooting location and a radius is equal to a predetermined value (for example, 1000 m).

The image data is acquired at the shooting location 1001. Then, the CPU 101 transmits the image data (the image file) that does not include the shooting location information to the WEB server 200 immediately after shooting. The CPU 201 shown in FIG. 2 can distribute the received image data to the communication devices 300 immediately.

The CPU 101 acquires the current location of the photographer at fixed intervals, and determines whether the shooting location information is transmitted to the WEB server 200 as follows.

The position 1002 is included in the GPS information concealing area 1004, i.e., it is not 1000 m away from the shooting location. Therefore, the CPU 101 does not transmit the shooting location information to the WEB server 200.

The position 1003 is not included in the GPS information concealing area 1004, i.e., it is more than 1000 m away from the shooting location. Therefore, the CPU 101 transmits the shooting location information and the image file name of the image that is shot at the shooting location 1001 to the WEB server 200. The CPU 201 can distribute the received shooting location information together with the image data associated by the image file name to the communication devices 300 (FIG. 3).

Figure 11:
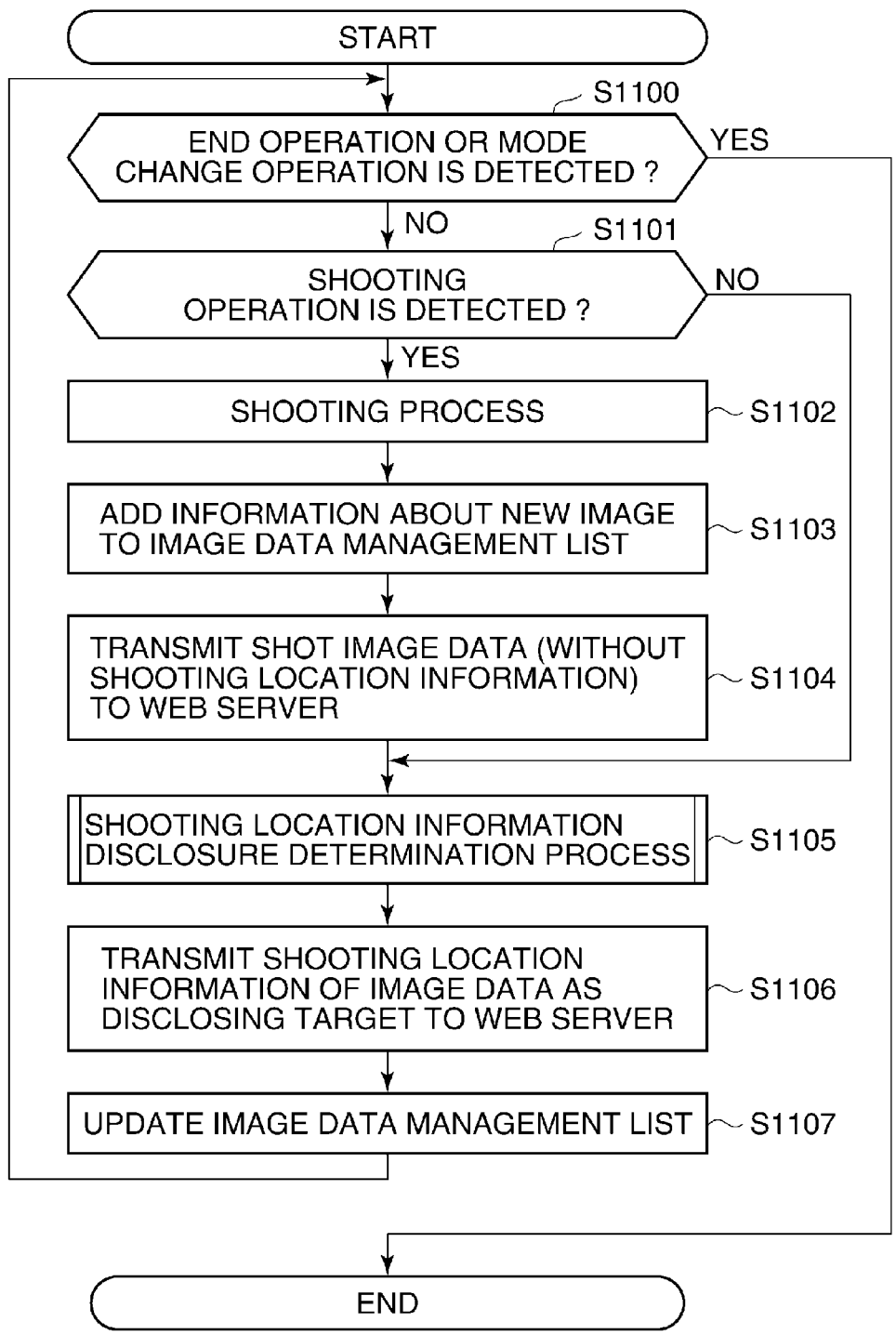
FIG. 11 is a flowchart showing an example of an operation of the digital camera shown in FIG. 1 in a shooting mode.

FIG. 11 is a flowchart showing an example of an operation of the digital camera shown in FIG. 1 in a shooting mode.

It is assumed that the digital camera 100 has been already set in the "shooting mode". When detecting a change to the "shooting mode", the CPU 101 determines whether an end operation or a mode change operation is detected (step S1100). That is, the CPU 101 determines whether any of the power button 502, the replay button 504, and the set button 505 is pushed. When the end operation or the mode change operation is detected (YES in the step S1100), the CPU 101 finishes the process in the "shooting mode."

On the other hand, when neither the end operation nor the mode change operation is detected (NO in the step S1100), the CPU 101 determines whether the shooting operation is detected, i.e., determines whether the release button 500 is pushed (step S1101). When the release button 500 is pushed (YES in the step S1101), the CPU 101 performs a shooting process (step S1102). Specifically, an optical image is converted into electric image data by the image pickup device, and, the shooting information (shooting date/time, a model name of the digital camera 100, etc.) is added to the image data. It should be noted that the shooting information does not include shooting location information.

Next, the CPU 101 adds the information about the image data to an image data management list (step S1103). The image data management list has an index that is a consecutive number of image data, and a file name of image data stored in the hard disk. Further, the image data management list has a shooting location information disclosed flag that shows whether shooting location information has been transmitted to the WEB server 200, and shooting location information that shows a location at which the image has been shot.

Since the shooting location information about the image data obtained by shooting in the step S1102 has not been transmitted to the WEB server 200, FALSE is set to the shooting location information disclosed flag.

Next, the CPU 101 transmits the image data obtained by shooting to the WEB server 200 (step S1104). At the time, the shooting location information is not included in the image data (the image file).

Next, the CPU 101 executes a shooting location information disclosure determination process mentioned later (step S1105). Then, the CPU 101 transmits the shooting location information, which correspond to the file name of the image data that is determined as a disclosing target in the process in the step S1105, to the WEB server 200 (step S1106).

Next, the CPU 101 sets TRUE to the shooting location information disclosed flag, which corresponds to the image data that has been successfully transmitted to the WEB server 200 in the step S1106, in the image data management list, and updates the image data management list (step S1107). Then, the CPU 101 returns the process to the step S1100.

It should be noted that the CPU 101 proceeds with the process to the step S1105 when the release button 500 is not pushed (NO in the step S1101).

As shown in FIG. 2, when receiving the image data from the digital camera 100, the CPU 201 adds the image data to the WEB page, and distributes the WEB page to the communication devices 300 in response to requests from the communication devices 300. It should be noted that the CPU 201 may record the received image data in a shared folder to allow the communication devices 300 to download the image data in response to the requests from the communication devices 300.

When receiving the file name and shooting location information of the image data from the digital camera 100, the CPU 201 adds the shooting location information to the WEB page. Then, the CPU 201 distributes the WEB page concerned to the communication devices 300 in response to requests from the communication devices 300. It should be noted that the CPU 201 may record the shooting location information in the shared folder in connection with the image data, and may allow the communication devices 300 to download the shooting location information together with the image data in response to the requests from the communication devices 300.

Next, the shooting location information disclosure determination process in the step S1105 in FIG. 11 will be described.

Figure 12:
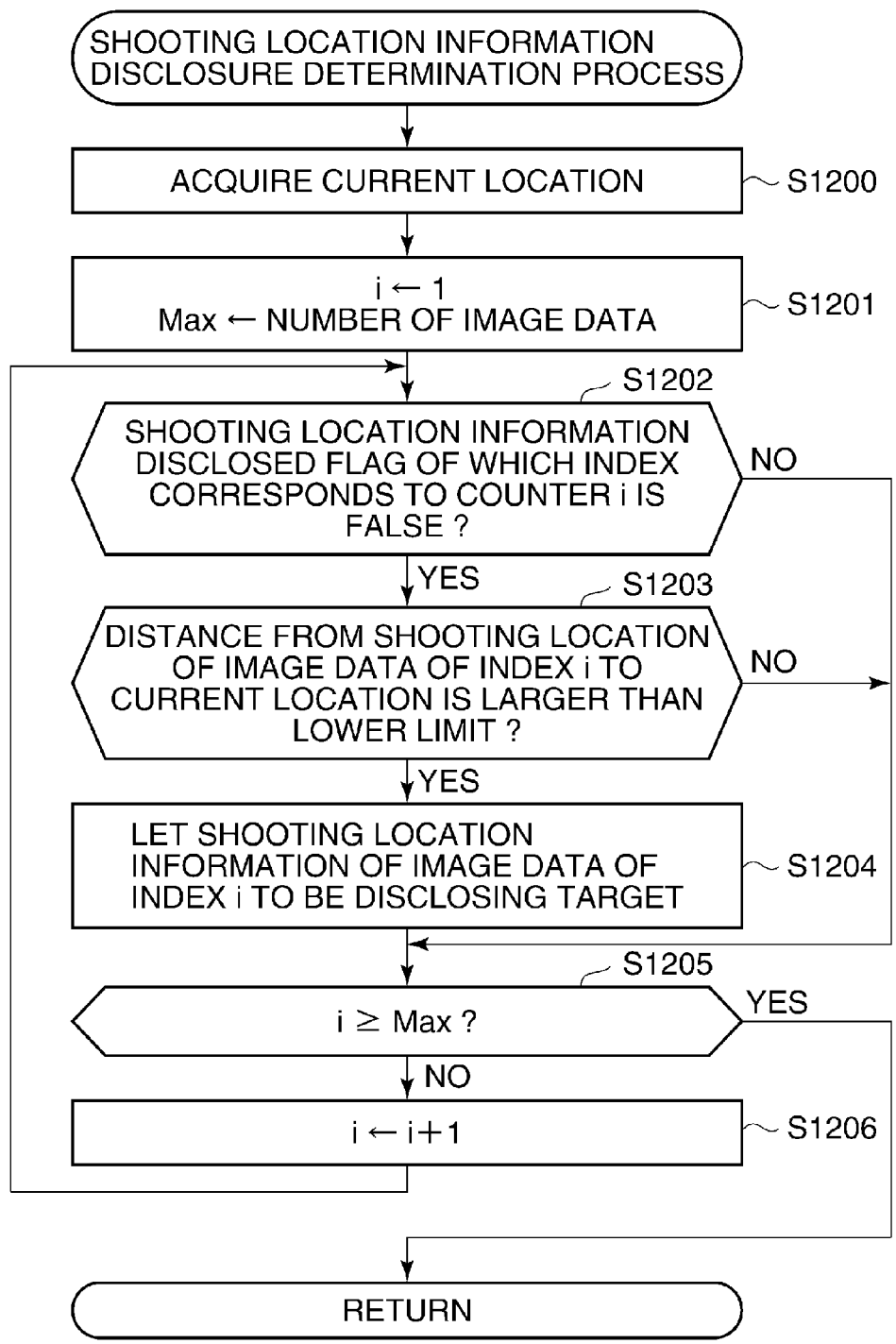
FIG. 12 is a flowchart showing details of a shooting location information disclosure determination process shown in FIG. 11.

FIG. 12 is a flowchart showing details of the shooting location information disclosure determination process shown in FIG. 11.

As shown in FIG. 1 and FIG. 12, in the shooting location information disclosure determination process, the CPU 101 acquires the current location of the digital camera 100 via the communication line 111 (step S1200). Next, the CPU 101 sets "1" to an internal counter i, and stores the number of image data registered in the image data management list into a register Max (step S1201).

Next, the CPU 101 determines whether the shooting location information disclosed flag with respect to the image data of which the index in the image data management list corresponds to the counter i is FALSE (step S1202).

When the shooting location information disclosed flag is FALSE (YES in the step S1202), the CPU 101 compares the current location with the shooting location of the image data of which the index in the image data management list agrees with the counter i (step S1203). Then, the CPU 101 determines whether the distance between the current location and the shooting location is larger than the lower limit that is set in the setting mode.

When the distance is larger than the lower limit (YES in the step S1203), the CPU 101 lets the shooting location information with respect to the image data of which the index in the image data management list agrees with the counter i be a disclosing target (step S1204).

Next, the CPU 101 determines whether the value of the counter i is equal to or larger than the value of the register Max (step S1205). Then, the CPU 101 finishes the shooting location information disclosure determination process when the value of the counter i is equal to or larger than the value of the register Max (YES in the step S1205). On the other hand, the CPU 101 increments (i=i+1) the counter i, returns the process to the step S1202, and continues the process when the value of the counter i is smaller than the value of the register Max (No in the step S1205).

It should be noted that the CPU 101 proceeds with the process to the step S1205 when the shooting location information disclosed flag is not FALSE (NO in the step S1202). In the same manner, the CPU 101 proceeds with the process to the step S1205 when the distance is smaller than the lower limit (NO in the step S1203).

Although the shooting location information received later is stored in connection with the image data in the above-mentioned example, the shooting location information may be stored by adding inside the image data.

The digital camera 100 transmits image data without shooting location information to the WEB server 200 at the time of shooting. Then, the digital camera 100 may transmit the image data with the shooting location information to the WEB server 200 to exchange the image data disclosed by the WEB server 200 at the time when the user is the predetermined distance away from the shooting location.

It should be noted that the digital camera 100 transmits the shooting location information to the WEB server 200 at the time when the digital camera 100 is the predetermined distance away from the shooting location in the above-mentioned example. However, the timing for transmitting the shooting location information is not limited to this. For example, the digital camera 100 may transmit the shooting location information to the WEB server when a predetermined period lapses from the shooting date/time.

According to a fourth embodiment, image data obtained by shooting with the digital camera 100 is uploaded to the WEB server 200 together with shooting location information. The WEB server 200 distributes the image data without the shooting location information to the communication devices 300 first, and then distributes the image data with the shooting location information to the communication devices 300 when the digital camera 100 is the predetermined distance away from the shooting location.

Figure 13:
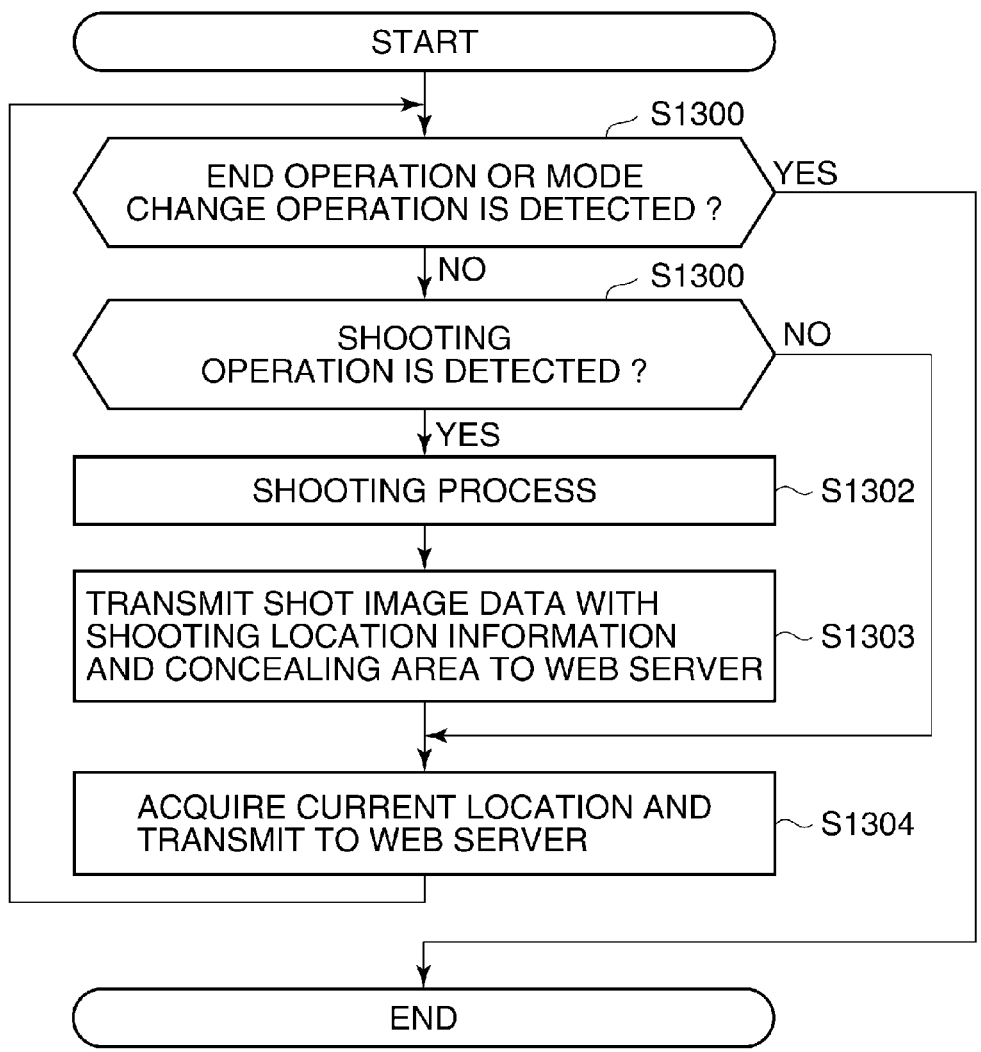
FIG. 13 is a flowchart showing another example of an operation of the digital camera shown in FIG. 1 in the shooting mode.

FIG. 13 is a flowchart showing another example of an operation of the digital camera shown in FIG. 1 in the shooting mode.

It is assumed that the digital camera 100 has been already set in the "shooting mode". When detecting a change to the "shooting mode", the CPU 101 determines whether an end operation or a mode change operation is detected (step S1300). That is, the CPU 101 determines whether any of the power button 502, the replay button 504, and the set button 505 is pushed. When the end operation or the mode change operation is detected (YES in the step S1300), the CPU 101 finishes the process in the "shooting mode."

On the other hand, when neither the end operation nor the mode change operation is detected (NO in the step S1300), the CPU 101 determines whether the shooting operation is detected, i.e., determines whether the release button 500 is pushed (step S1301). When the release button is pushed (YES in the step S1301), the CPU 101 performs a shooting process (step S1302). Specifically, an optical image is converted into electric image data by the image pickup device, and, the shooting information (shooting date/time, shooting location information, a model name of the digital camera 100, etc.) is added to the image data.

Next, the CPU 101 transmits the image data obtained by shooting and the shooting location information concealing area 1004 (FIG. 10) to the WEB server 200 (step S1303). Then, the CPU 101 acquires the information showing the current location of the digital camera 100 via the communication line 111, and uploads the current location information concerned to the WEB server 200 (step S1304). Then, the CPU 101 returns the process to the step S1300.

It should be noted that the CPU 101 proceeds with the process to the step S1304 when the release button 500 is not pushed (NO in the step S1101).

Figure 14:
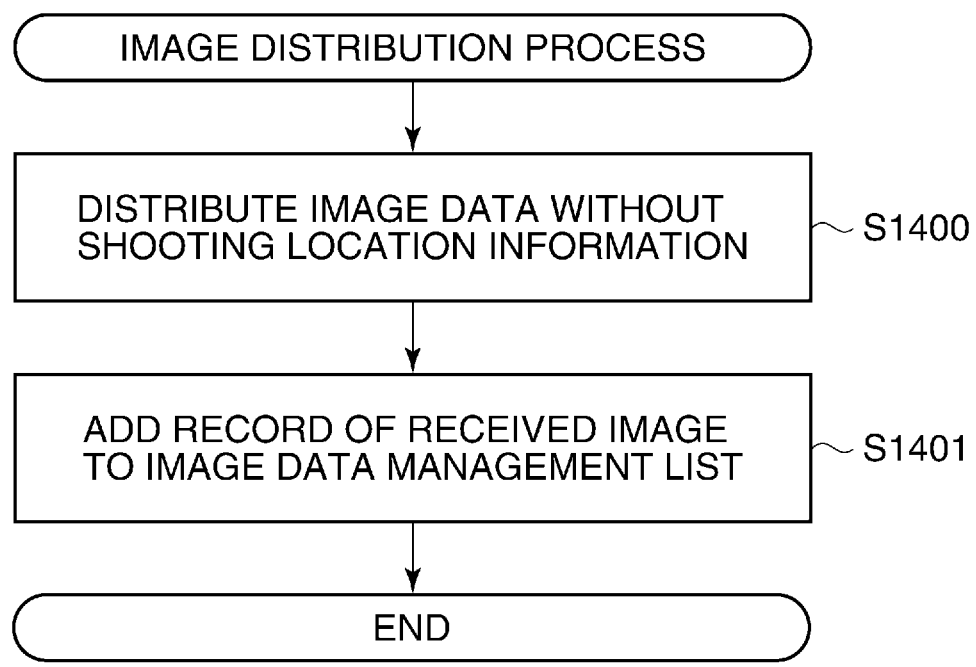
FIG. 14 is a flowchart showing an image distribution process in the server shown in FIG. 2.

FIG. 14 is a flowchart showing an image distribution process in the WEB server 200 shown in FIG. 2.

As shown in FIG. 2 and FIG. 14, when the image distribution process starts, the CPU 201 receives the image data transmitted from the digital camera 100 in step S1303 in FIG. 13, and saves it to the HDD 205. Then, the CPU 201 distributes the image data to the communication devices 300 in response to requests from the communication devices 300 (step S1400). Here, the shooting location information is not yet distributed.

Next, the CPU 201 adds a record of the received image data to the image data management list (step S1401). And the CPU 201 finishes the image distribution process.

Each record of the image data management list contains the index that is the consecutive number of image data, the file name of image data recorded in the HDD 205, the shooting location information disclosed flag, the shooting location information of the image data, and the shooting location information concealing area.

Shooting location information disclosed flag of newly added image data is set to FALSE because shooting location information thereof is not distributed.

Figure 15:
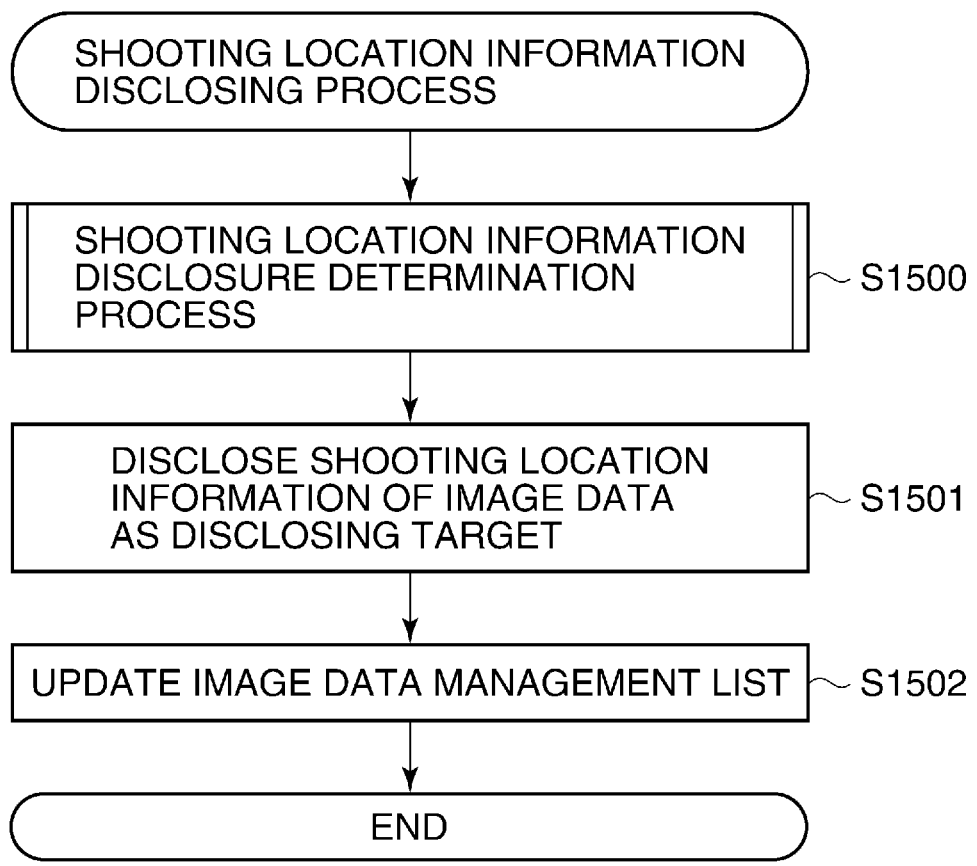
FIG. 15 is a flowchart showing a shooting location information disclosing process in the WEB server shown in FIG. 2.

FIG. 15 is a flowchart showing a shooting location information disclosing process in the WEB server 200 shown in FIG. 2.

When the predetermined time has lapsed from the reception of image data or when a request from one of the communication devices 300 has been received, the CPU 201 executes the shooting location information disclosure determination process (step S1500).

Specifically, the CPU 201 acquires the current location information showing the current location of the digital camera 100 from the digital camera 100. Then, the CPU 201 sets "1" to the counter i, and stores the number of image data registered in the image data management list into the register Max in the same manner as the process in the step S1201 in FIG. 12. Then, the CPU 201 determines whether the shooting location information disclosed flag with respect to the image data of which the index in the image data management list corresponds to the counter i is FALSE in the same manner as the process in the step S1202 in FIG. 12.

When the shooting location information disclosed flag is FALSE, the CPU 201 compares the current location with the shooting location of the image data of which the index in the image data management list agrees with the counter i in the same manner as the process in the step S1203 in FIG. 12. Then, the CPU 201 determines whether the current location is out of the shooting location information concealing area registered in the image data management list.

When the current location is out of the shooting location information concealing area, the CPU 201 lets the shooting location information with respect to the image data of which the index in the image data management list agrees with the counter i be distributable to the communication devices 300 in the same manner as the process in the step S1204 in FIG. 12.

Next, the CPU 201 discloses i.e., distributes the shooting location information to the communication devices 300 (step S1501). Then, the CPU 201 updates the image data management list (step S1502). Specifically, the CPU 201 sets TRUE to the shooting location information disclosed flag with respect to the image data of which the shooting location information is made distributable. Then, the CPU 201 finishes the shooting location information disclosing process.

In the above-mentioned example, the photographer manually sets the shooting location information concealing area (it is only called a "concealing area" hereafter). Other setting methods will be described below.

A concealing area may be determined according to a shooting location. For example, the digital camera 100, which stores information showing a home position of a photographer, sets a wide concealing area when shooting near the home position and sets a narrow concealing area when shooting distant from the home position.

Further, a concealing area may be determined according to shooting information other than shooting location information. For example, a wide concealing area is set when a shot image includes a subject by which a shooting location can be specified, and a narrow concealing area is set when a shot image does not include such a subject. Still further, a wide concealing area may be set when shooting in daytime, and a narrow concealing area may be set when shooting at night.

In addition, a concealing area may be determined according to settings of an upload destination. For example, a wide concealing area is set when an upload destination is a WEB server to which many and unspecified communication devices can access, and a narrow concealing area is set when an upload destination is a WEB server to which only specific communication devices can access.

A concealing area may be determined according to movement speed of the digital camera 100, i.e., a photographer. For example, a wide concealing area is set when moving at high speed using a car etc., and a narrow concealing area is set when moving at low speed on foot etc.

Although the above-mentioned example acquires the current location information about the digital camera 100 at fixed intervals, the current location information can be acquired by the following timings, too. For example, when turning ON/OFF of a power of a communication device like a GPS receiver, when shifting to a sleep mode, when operating for a next shooting, when finishing continuous shooting or moving image shooting, or when remaining capacity of a recording medium becomes less than prescribed capacity, the current location information may be acquired.

According to a fifth embodiment, the digital camera 100 uploads an image file (image data) to the WEB server 200 after a fixed time lapses from shooting. It should be noted that the WEB server 200 can distribute an image file to the communication devices 300 immediately after receiving the image file from the digital camera 100.

Figure 16:
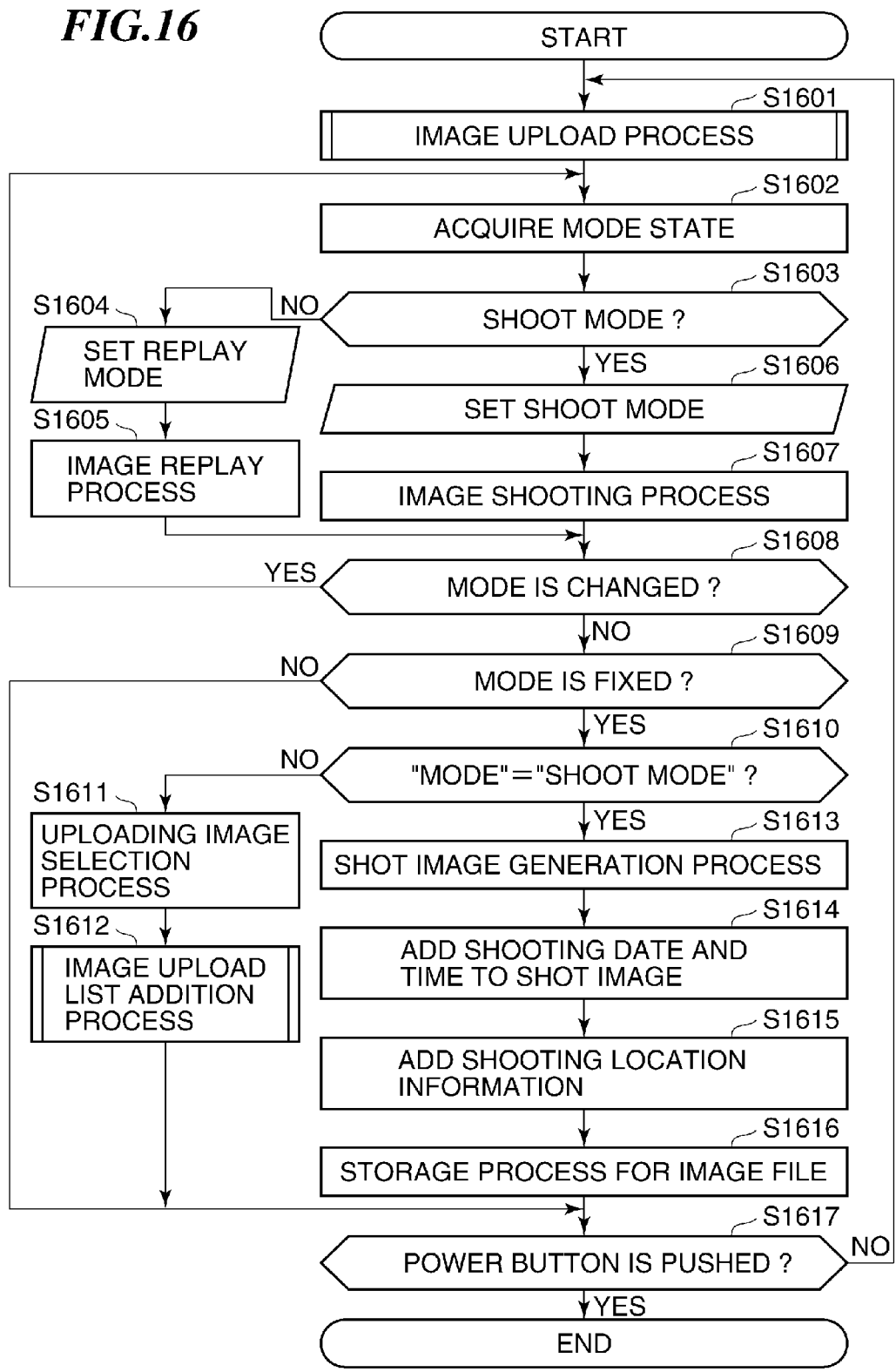
FIG. 16 is a flowchart showing an operation of the digital camera shown in FIG. 1 at the time of uploading an image file to the WEB server shown in FIG. 2 after shooting.

FIG. 16 is a flowchart showing an operation of the digital camera 100 shown in FIG. 1 at the time of uploading an image file to the WEB server 200 shown in FIG. 2 after shooting. In the following description, the CPU 101 reads various programs from the RAM 103, and shall operate according to the programs concerned. It should be noted that the digital camera 100 has stored the image upload list in the RAM 103.

When the power of the digital camera 100 is turned ON, the CPU 101 starts the following process. First, the CPU 101 executes an image upload process (an image distribution process) in step S1601. The image upload process will be described later.

When the image upload process is completed, the CPU 101 acquires a mode state set by mode change switches (the shoot button 503 and the replay button 504) in step S1602. Then, the CPU 101 determines whether the mode state is the shoot mode (step S1603).

When the mode state is the replay mode rather than the shoot mode (NO in the step S1603), the CPU 101 sets the "replay mode" to the "mode" (step S1604). Then, the CPU 101 executes an image replay process to display the recorded images (step S1605), and proceeds with the process to step S1608.

On the other hand, when the mode state is the shoot mode (YES in the step S1603), the CPU 101 sets the "shoot mode" to the "mode" (step S1606). Then, the CPU 101 executes an image shooting process (step S1607).

Next, the CPU 101 checks the mode change switches, and determines whether the mode has been changed or not (step S1608). When the mode has been changed (YES in the step S1608), the CPU 101 returns the process to the step S1602, and continues the process.

When the mode is not changed (NO in the step S1608), the CPU 101 determines whether the mode has been fixed. That is, the CPU 101 determines whether an execution button (not shown) has been pushed (step S1609).

When the mode is fixed (YES in the step S1609), the CPU 101 determines whether the "mode" is the "shoot mode" (step S1610).

When the "mode" is not the "shoot mode" but the "replay mode" (NO in the step S1610), the CPU 101 selects images of uploading targets. That is, the CPU 101 executes an uploading image selection process (step S1611). For example, the CPU 101 displays a list of recorded image data files on the display unit 104. Then, the CPU 101 selects the images of the uploading targets in response to operations by a photographer.

After completion of the uploading image selection process, the CPU 101 executes an image upload list addition process mentioned later to update an image upload list (step S1612). Then, the CPU 201 proceeds with the process to step S1617 mentioned later.

The image upload list stores a file name and uploaded time of an image file of an uploading target in connection with each other. The image upload list contains items of "Index", "file name of image file", and "uploaded time" at least. When an image file is selected as an uploading target, a file name and uploaded time of the image file concerned are added and stored in the image upload list. When the image file upload process is completed, the record corresponding to the image file concerned is deleted from the image upload list.

On the other hand, when the "mode" is the "shoot mode" (YES in the step S1610), the CPU 101 generates image data as an image file by encoding video signals (image signals) inputted from the image pickup unit 114 (a shot image generation process: step S1613). Then, the CPU 101 adds shooting date/time to the image file concerned (step S1614).

The CPU 101 acquires shooting location information and adds it to the image file (step S1615), and executes a storage process for the image file concerned (step S1616).

Then, the CPU 101 determines whether the power button 502 has been pushed (step S1617). When the power button 502 has been pushed (YES in the step S1617), the CPU 101 finishes the process. On the other hand, when the power button is not pushed (NO in the step S1617), the CPU 101 returns the process to the step S1601 and continues the process.

It should be noted that the CPU 101 proceeds with the process to the step S1617 to determine whether the power button has been pushed, when the mode is not fixed (NO in the step S1609).

Figure 17:
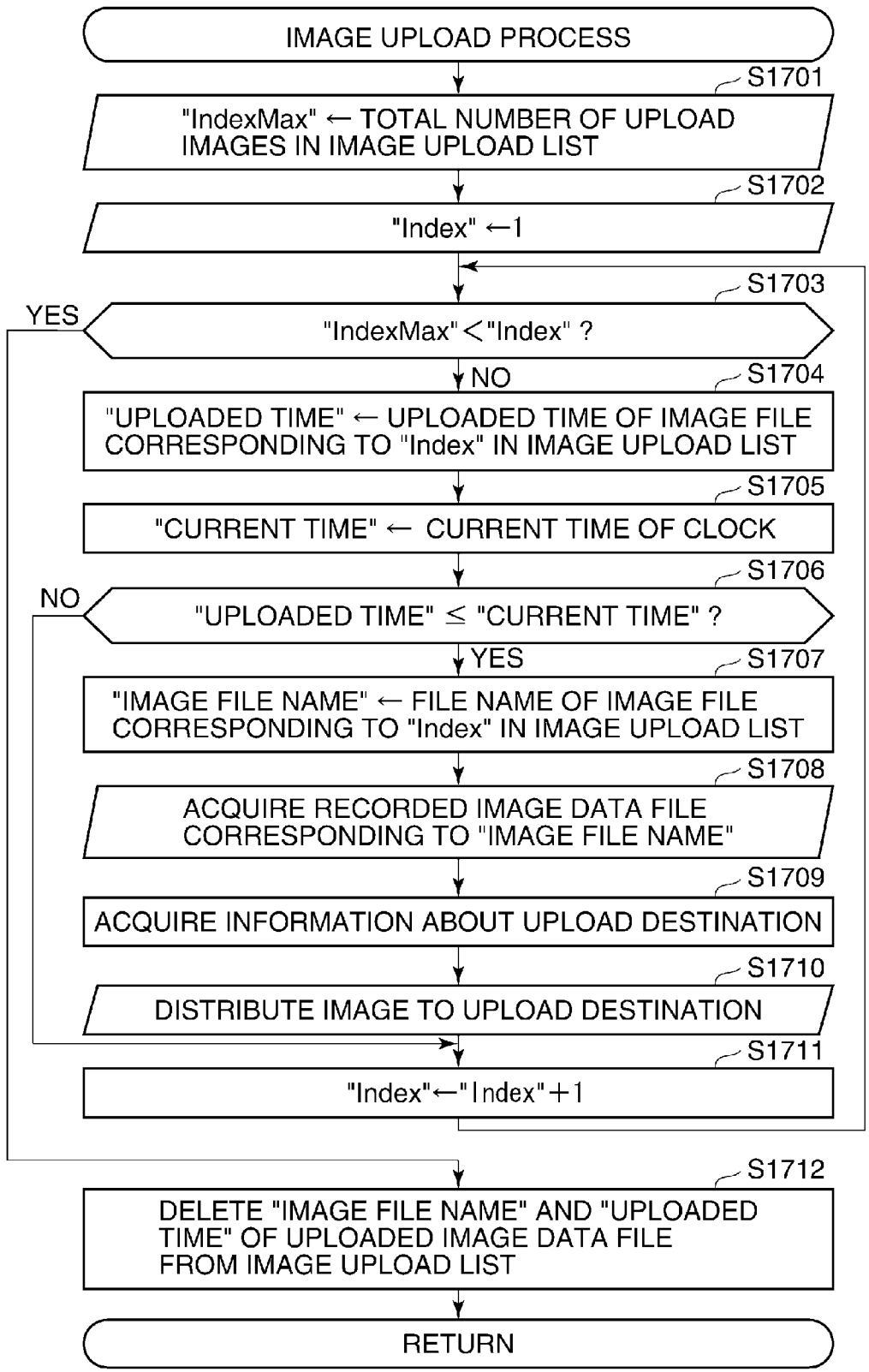
FIG. 17 is a flowchart showing an image upload process executed in step S1601 in the process shown in FIG. 16.

FIG. 17 is a flowchart showing an image upload process executed in the step S1601 in the process shown in FIG. 16.

As shown in FIG. 1 and FIG. 17, the CPU 101 acquires the total number of the upload images stored in the image upload list, first, and sets the total number to a counter "Index Max" (step S1701). Next, the CPU 101 sets "1" to a counter "Index" (step S1702), and determines whether "Index Max" is smaller than "Index" (step S1703).

When "Index Max" is equal to or larger than "Index" (NO in the step S1703), the CPU 101 acquires the uploaded time of the image file corresponding to "Index" in the image upload list. Then, the CPU 101 sets the acquired uploaded time to a variable "uploaded time" (step S1704).

Next, the CPU 101 acquires current time from an internal clock and set the acquired current time to a variable "current time" (step S1705). Then, the CPU 101 determines whether the "uploaded time (distributed time)" is earlier than the "current time" (step S1706). When the "uploaded time" is earlier than the "current time" (YES in the step S1706), the CPU 101 acquires the file name of the image file corresponding to the "Index" in the image upload list, and sets the file name to a variable "image file name" (step S1707). On the other hand, when the "uploaded time" is later than the "current time" (NO in the step S1706), the CPU 101 increments the counter "Index" by "1" without setting the file name (step S1711).

Next, the CPU 101 acquires the recorded image data corresponding to the "image file name" from the storage medium (step S1708). Then, the CPU 101 acquires information about upload destination (distribution destination) concerning the WEB server 200 via the communication line 111 (step S1709). Then, the CPU 101 uploads the image data file to the WEB server 200 concerned (step S1710).

Thus, the CPU 101 has determined whether lapsed time from the shooting time to the current time is longer than a predetermined standby time by comparing the current time and the uploaded time in the step S1706.

Next, the CPU 101 increments the counter "Index" by "1" (step S1711), returns the process to the step S1703, and continues the process. It should be noted that the CPU 101 proceeds with the process to the step S1711 when the "uploaded time" is later than the "current time" (NO in the step 1706).

When the "Index Max" is smaller than the "Index" (YES in the step S1703), the CPU 101 delete the "image file name" and the "uploaded time" of the uploaded image data files from the image upload list (step S1712). Then, the CPU 101 finishes the image upload process, and proceeds with the process to the step S1602 in FIG. 16.

Although the "current time" is acquired using the internal clock with which the digital camera 100 is provided in the above-mentioned example, the "current time" may be acquired from GPS information. Or the "current time" may be acquired from the WEB server 200. Although the upload destination is the WEB server 200 in the above-mentioned example, there may be a plurality of upload destinations (a mail server etc.). In such a case, a photographer can select at least one upload destination from the upload destinations.

Figure 18:
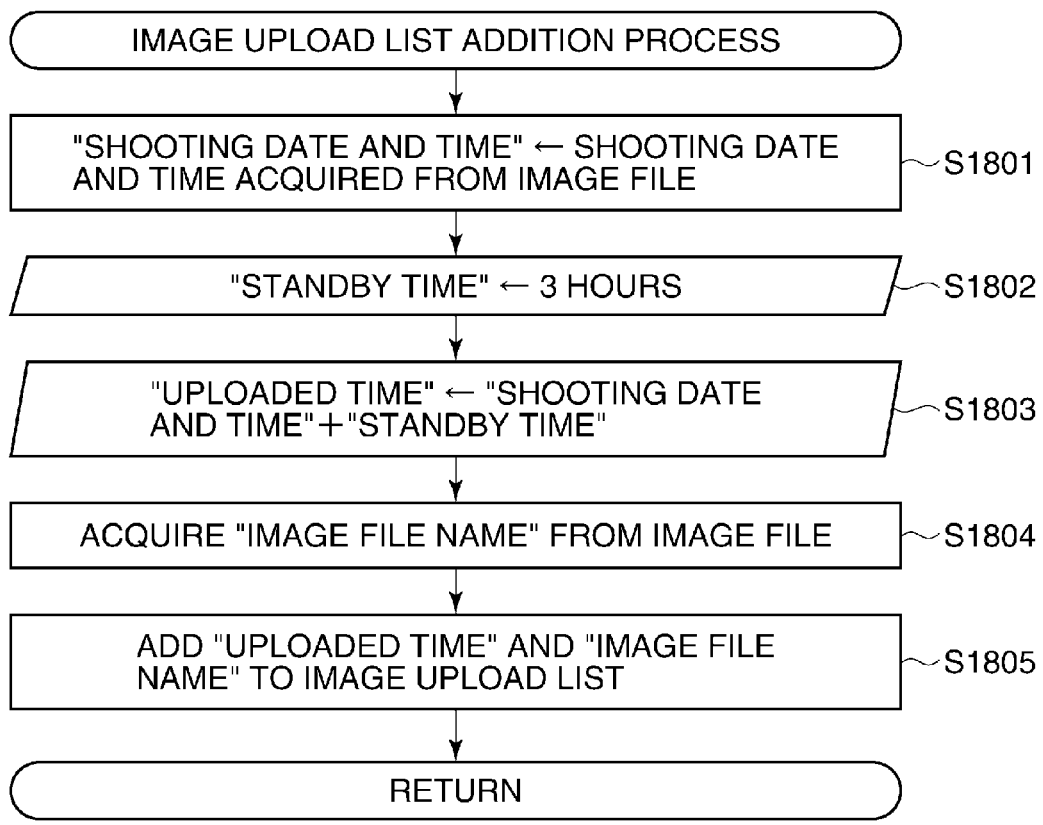
FIG. 18 is a flowchart showing an image upload list addition process executed in step S1612 in FIG. 16.

FIG. 18 is a flowchart showing the image upload list addition process executed in the step S1612 in FIG. 16.

The CPU 101 acquires shooting date/time from metadata that shows the shooting date/time of the image file selected in the step S1611 in FIG. 16, and sets the acquired date to a variable "shooting date/time" (step S1801). Then, the CPU 101 sets "3 hours" to a variable "standby time", for example (step S1802).

Next, the CPU 101 sets the time that is the sum of the "shooting date/time" and the "standby time" to the "uploaded time" (step S1803). The CPU 101 acquires the "image file name" from the image file (step S1804), and registers the "uploaded time" and the "image file name" to the image upload list (step S1805). Then, the CPU 101 finishes the image upload list addition process, and proceeds with the process to the step S1617 in FIG. 16.

Although the "standby time" is set to 3 hours in the above-mentioned example, it is possible to set a desired time by a photographer. Further, it is possible to set short standby time when the shooting date/time indicates night, and to set long standby time when the shooting date/time indicates daytime.

When an upload destination can be browsed by many and unspecified users, certain standby time may be set. When an upload destination has access restriction and can be browsed by only specific users, no standby time may be set. Anyway, the standby time may be adjusted according to conditions of an upload destination.

When GPS information (shooting location information) cannot be added to an image file due to radio disturbance of GPS information at the time of saving an image file, no standby time may be set in order to allow immediate upload.

As mentioned above, the digital camera 100 uploads the image file to the WEB servers 200 after lapsing the fixed time from the shooting date/time of the image file in the above-mentioned example. This prevents the user of the communication device, which downloads the image file from the WEB server 200, from knowing the current location of the photographer based on the shooting information like the shooting location and the shooting date/time added to the image file.

According to a sixth embodiment, the WEB server 200 shown in FIG. 2 receives an image file from the digital camera 100 shown in FIG. 1, and distributes the image file to the communication devices after fixed time lapses from the shooting time of the image file. The digital camera 100 can upload an image file to the WEB server 200 immediately after shooting an image. In the following description, descriptions for parts similar to that in the fifth embodiment are omitted.

It should be noted that distribution of an image means that the WEB server 200 changes a condition of an image file that is classified and stored in a shared folder of the hard disk so that a communication device can download the image file via the network.

Figure 19:
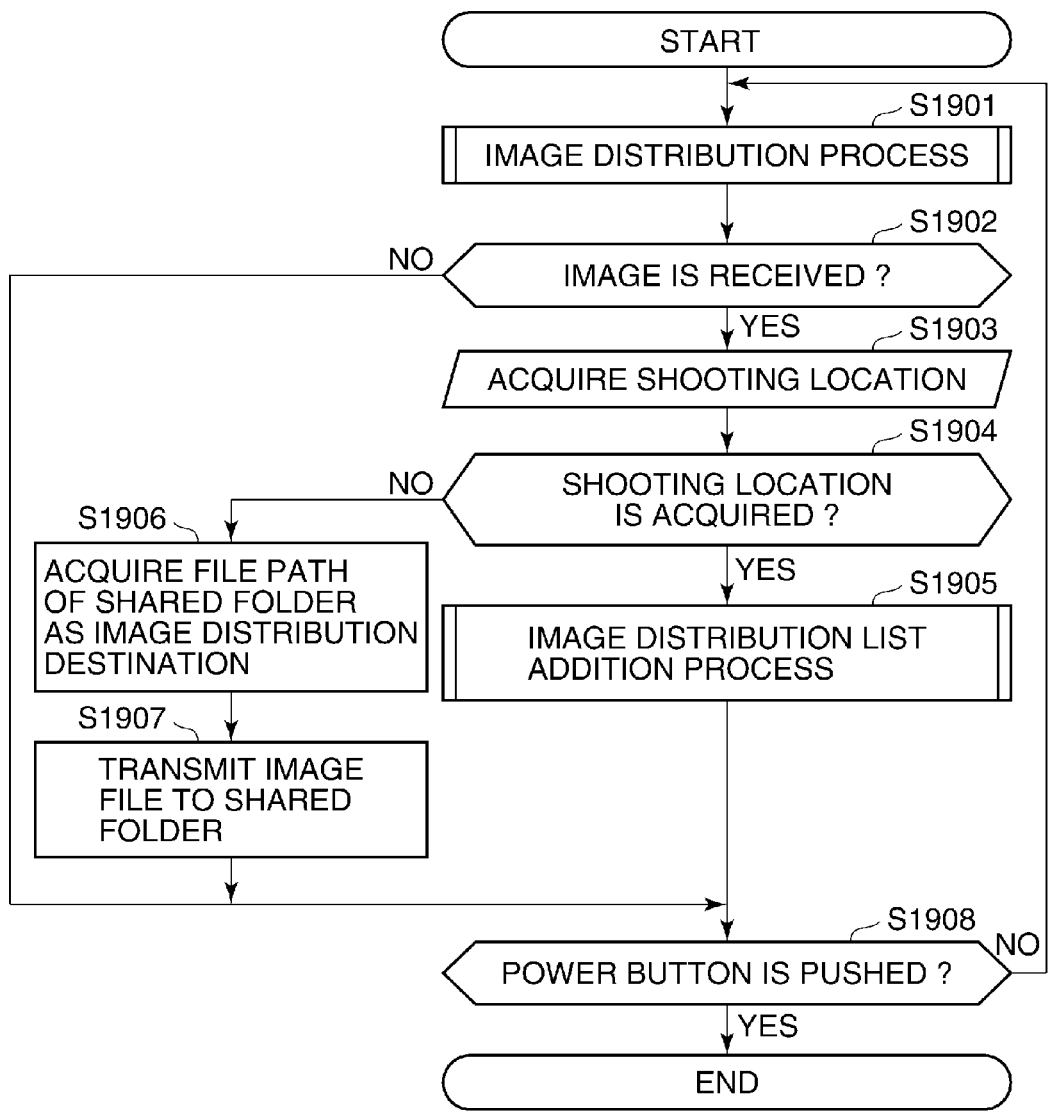
FIG. 19 is a flowchart showing an operation of the WEB server shown in FIG. 2 at the time of receiving an image file from the digital camera and distributing the image file to the communication device shown in FIG. 3.

FIG. 19 is a flowchart showing an operation of the WEB server 200 shown in FIG. 2 at the time of receiving an image file from the digital camera 100 and distributing the image file to the communication devices 300 shown in FIG. 3.

In the following description, the CPU 201 reads various programs from the RAM 203, and shall operate according to the programs concerned.

As shown in FIG. 1 through FIG. 3, and FIG. 19, the CPU 201 compares the uploaded time of the image and the current time, and executes the image distribution process when the current time is later than the uploaded time (step S1901), in the same manner as the image upload process shown in FIG. 17. The image distribution process here means a process for transmitting an image file to the shared folder as a distribution destination instead of an upload destination.

Next, the CPU 201 determines whether the image file has been received from the digital camera 100 (step S1902). When an image file has been received (YES in the step S1902), the CPU 201 acquires the shooting location information of the received image file concerned (step S1903). For example, the CPU 201 acquires the shooting location information that indicates the shooting location from metadata of the received image file.

Next, the CPU 201 determines whether the shooting location has been acquired (step S1904). When the shooting location has been acquired (YES in step S1904), the CPU 201 updates an image distribution list in the same manner as the image upload list addition process shown in FIG. 18 (step S1905). It should be noted that the image distribution list stores a file name and distribution time of an image file of a distribution target in connection with each other. The image distribution list contains items of "Index", "file name", and "distribution time" at least. When receiving an image file from the digital camera 100, the CPU 201 adds a file name and a distribution time of the received image file to the image distribution list. Then, when the image file has been distributed, the CPU 201 deletes the record of the image file concerned from the image distribution list.

After completion of the image distribution list addition process, the CPU 201 checks whether the power button 502 is pushed (step S1908). When the power button 502 is not pushed (NO in the step S1908), the CPU 201 returns the process to the step S1901 and continues the process. When the power button 502 is pushed (YES in the step S1908), the CPU 201 finishes the process.

On the other hand, when the shooting location is not acquired (NO in the step S1904), the CPU 201 determines that there is no shooting location information, and acquire the file path of the shared folder as the distribution destination (step S1906). Then, the CPU 201 transmits the image file to the shared folder (step S1907). Then, the CPU 201 proceeds with the process to the step S1908.

Although the shooting location is acquired from the metadata of the received image file in the above-mentioned example, the shooting location may be acquired from another file related with the image file or the external apparatus.

As mentioned above, the WEB server 200 distributes the image file to the communication devices after lapsing the fixed time from the shooting date/time of the image file concerned in the above-mentioned example. This prevents the user of the communication device, which downloads the image file from the WEB server 200, from knowing the current location of the photographer based on the shooting location and the shooting date/time of the image file.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-140528, filed Jun. 21, 2010, which is hereby incorporated by reference herein in its entirety.

What is claimed is:

1. An image pickup apparatus capable of being movable and storing an image file including image data from an image pickup device, comprising:
   an acquisition unit configured to acquire a current location of the image pickup apparatus;
   an obtaining unit configured to obtain a shooting location from the image file, wherein the shooting location corresponds to a location where the image file was shot;
   a calculation unit configured to calculate a distance from the shooting location of the image file to the current location of the image pickup apparatus; and
   a transmission control unit configured to control to transmit the image file to an external apparatus if the distance is larger than a threshold value, and not to transmit the image file to the external apparatus if the distance is not larger than the threshold value.

2. The image pickup apparatus according to claim 1, wherein the threshold value is changed according to at least one of a type of the external apparatus, a type of a subject included in the image file, a movement speed of the image pickup apparatus, a region of the shooting location, and a shooting date/time of the image file.

3. An image pickup apparatus storing an image file including image data from an image pickup device, comprising:
   an acquisition unit configured to acquire a current time;
   an obtaining unit configured to obtain a shooting time from the image file, wherein the shooting time corresponds to a time at which the image file was shot; and
   a transmission control unit configured to control to transmit the image file to an external apparatus if a difference between the shooting time of the image file and the current time is larger than a predetermined period, and not to transmit the image file to the external apparatus if the difference between the shooting time of the image file and the current time is not larger than the predetermined period.

4. The image pickup apparatus according to claim 3, wherein said transmission control unit controls to transmit the image file without the shooting location to the external apparatus before passing the predetermined period from the shooting time to the current time.

5. The image pickup apparatus according to claim 3, wherein the predetermined period is set based on one or more of: an input by a user of the image pickup apparatus, the shooting time, availability of a shooting location information corresponding to the image file, and access conditions of the external apparatus.

6. An information transmission method to move and store an image file including image data from an image pickup device, comprising: an acquisition step of acquiring a current location of the image pick up apparatus; an obtaining step of obtaining a shooting location from the image file, wherein the shooting location corresponds to a location where the image file was shot; a calculation step of calculating a distance from the shooting location of the image file to the current location of the image pickup apparatus; and a transmission step of transmitting the image file to an external apparatus if the distance is larger than a threshold value, and not transmitting the image file to the external apparatus if the distance is not larger than the threshold value.

7. An information transmission method to move and store an image file including image data from an image pickup device, comprising: an acquisition step of acquiring a current date/time of the image pick up apparatus; an obtaining step of obtaining a shooting date/time from the image file, wherein the shooting date/time corresponds to a date and a time at which the image file was shot; a calculation step of calculating a lapsed time from the shooting date/time of the image file to the current date/time of the image pickup apparatus; and a transmission step of transmitting the image file to an external apparatus if the lapsed time is longer than a threshold value, and not transmitting the image file to the external apparatus if the lapsed time is not larger than the threshold value.

8. A non-transitory computer-readable storage medium storing a control program causing a computer to execute an information transmission method to move and store an image file including image data from an image pickup device, the information transmission method comprising: an acquisition step of acquiring a current location of the image pick up apparatus; an obtaining step of obtaining a shooting location from the image file, wherein the shooting location corresponds to a location where the image file was shot; a calculation step of calculating a distance from the shooting location of the image file to the current location of the image pickup apparatus; and a transmission step of transmitting the image file to an external apparatus if the distance is larger than a threshold value, and not transmitting the image file to the external apparatus if the distance is not larger than the threshold value.

9. A non-transitory computer-readable storage medium storing a control program causing a computer to execute an information transmission method to move and store an image file including image data from an image pickup device, the information transmission method comprising: an acquisition step of acquiring a current date/time of the image pick up apparatus; an obtaining step of obtaining a shooting date/time from the image file, wherein the shooting date/time corresponds to a date and a time at which the image file was shot; a calculation step of calculating a lapsed time from the shooting date/time of the image file to the current date/time of the image pickup apparatus; and a transmission step of transmitting the image file to an external apparatus if the lapsed time is longer than a threshold value, and not transmitting the image file to the external apparatus if the lapsed time is not larger than the threshold value.

* * * * *